United States Patent [19]
Takara

[11] Patent Number: 6,049,146
[45] Date of Patent: Apr. 11, 2000

[54] ELECTROMAGNETIC PISTON ENGINE

[76] Inventor: Muneaki Takara, 19-20, Oroku 1-chome, Naha-shi, Okinawa, Japan

[21] Appl. No.: 09/091,930
[22] PCT Filed: Dec. 24, 1996
[86] PCT No.: PCT/JP96/03770
   § 371 Date: Oct. 13, 1998
   § 102(e) Date: Oct. 13, 1998
[87] PCT Pub. No.: WO97/23728
   PCT Pub. Date: Jul. 3, 1997

[30]  Foreign Application Priority Data

Dec. 25, 1995 [JP] Japan .................................. 7-337422

[51] Int. Cl.$^7$ .......................... H02K 7/075; H02K 33/10
[52] U.S. Cl. ................................................ 310/24; 310/23
[58] Field of Search .................................. 310/13, 23, 24, 310/29, 30, 34, 35

[56]  References Cited

U.S. PATENT DOCUMENTS 3,942,913  3/1976  Bokelman ............................ 310/24 X
4,631,455  12/1986  Taishoff ................................. 318/37

FOREIGN PATENT DOCUMENTS 50-56511  5/1975  Japan .
57-34762  2/1982  Japan .
5-22894   1/1993  Japan .

*Primary Examiner*—Nestor Ramirez
*Assistant Examiner*—Judson H. Jones
*Attorney, Agent, or Firm*—Morrison & Foerster LLP

[57]  ABSTRACT

The present invention relates to an electromagnetic piston engine capable of producing driving power by a reciprocal movement of a piston in a cylinder by electromagnetic force. The present invention has the objects to provide the electromagnetic piston engine which can do without a variety of resistance inherent in internal combustion piston engines, which reduces the weight corresponding to a rotary assembly portion to a smaller value even if a great output is produced, which can be readily employed together with power transmission mechanisms and so on for use with conventional internal combustion piston engines, and which has a high efficiency in energy consumption. The electromagnetic piston engine is provided with the cylinder and the piston made each of a magnetic material as well as with as the cylinder electromagnet having the inner wall of the cylinder magnetizable to a one magnetic pole and with the piston magnetization unit for magnetizing a portion of the piston engageable with the cylinder to a single magnetic pole in a fixed manner. The magnetization of the cylinder electromagnet generates magnetically attracting force between the cylinder and the piston to cause the piston to move in a one direction and thereafter magnetically repellent force to transfer the piston in the opposite direction. This series of the actions are repeated to provide a continual reciprocal movement of the piston.

20 Claims, 23 Drawing Sheets

FIG.4

| DIAMETER (mm) | SECTIONAL AREA (mm²) | NUMBER OF WINDINGS | CURRENT (A) | MAGNETIC FORCE (g) |
|---|---|---|---|---|
| 0.4 | 0.04 π | 100 | 2.70 | 51 |
| 0.4 | 0.04 π | 200 | 2.60 | 101 |
| 0.35 | 0.03 π | 200 | 2.55 | 86 |
| 0.35 | 0.03 π | 235 ✳ | 2.50 | 115 |
| 1.0 | 0.25 π | 100 | 2.94 | 55 |
| 0.3 | 0.0225 π | 700 ✳ | 1.66 | 118 |

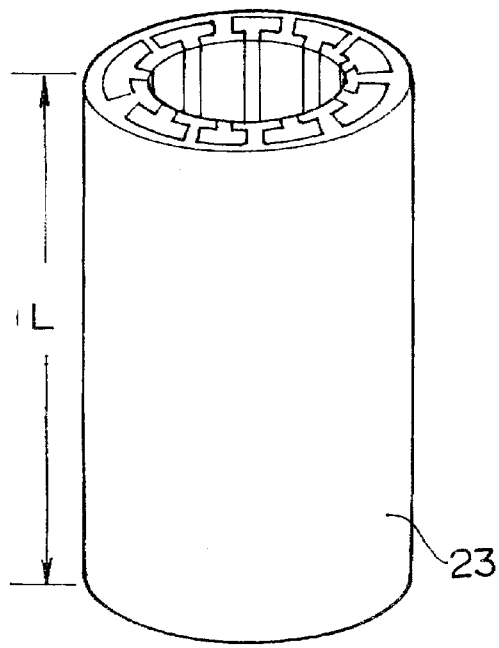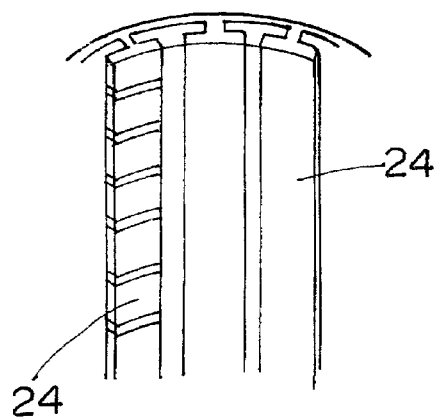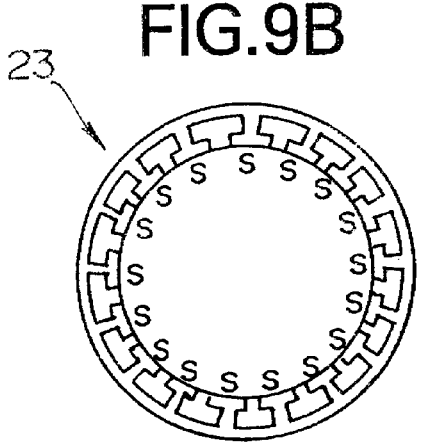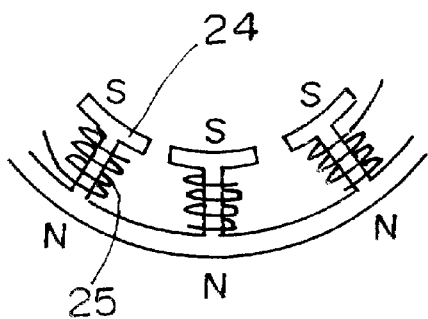

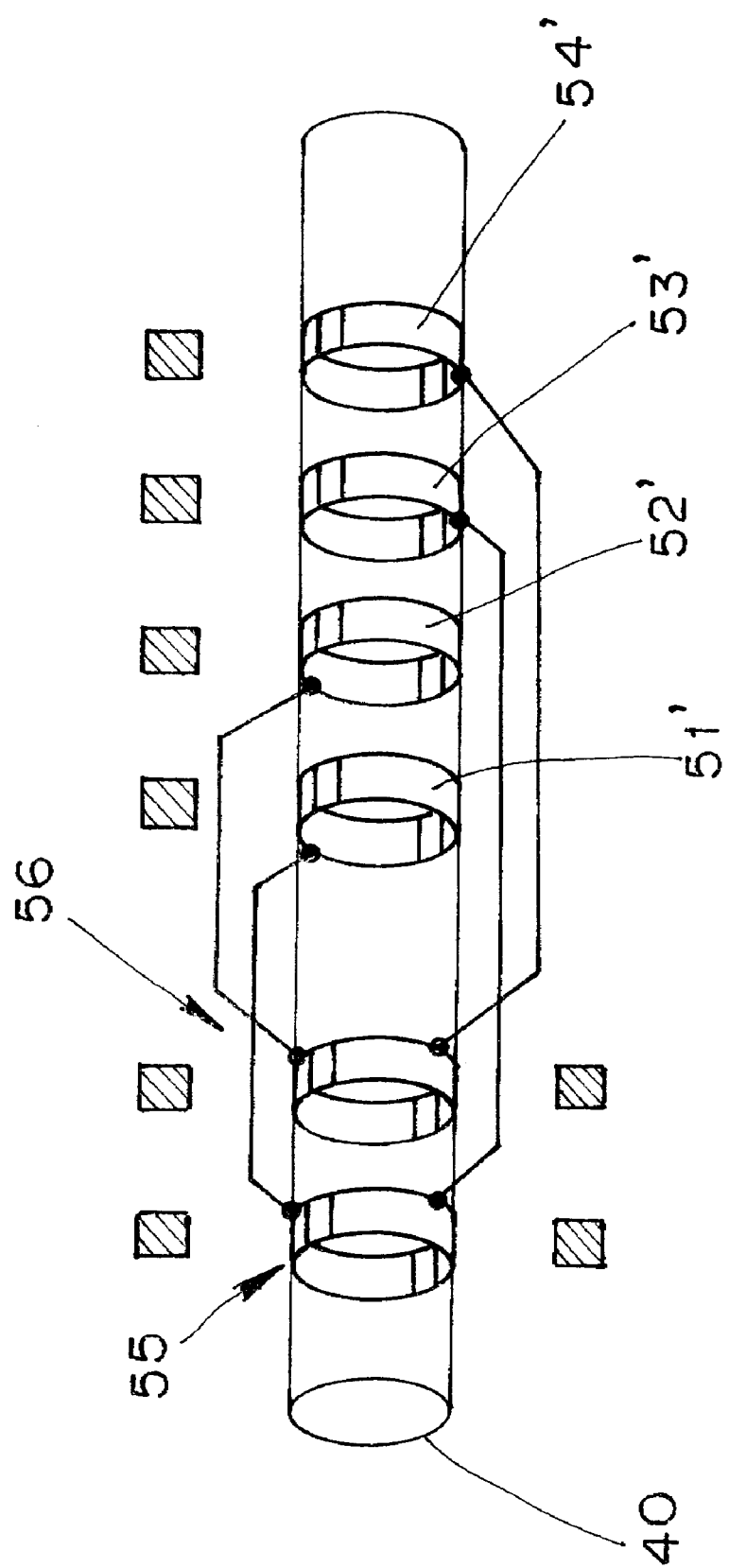

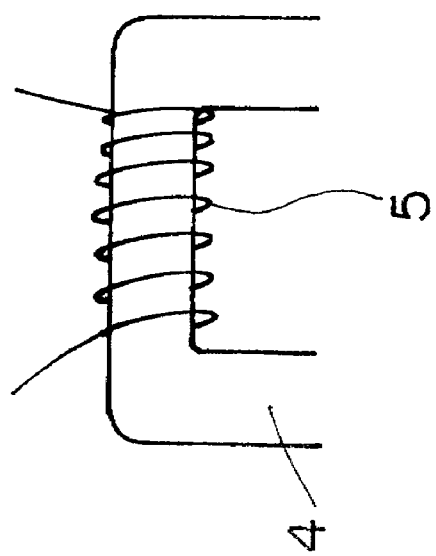
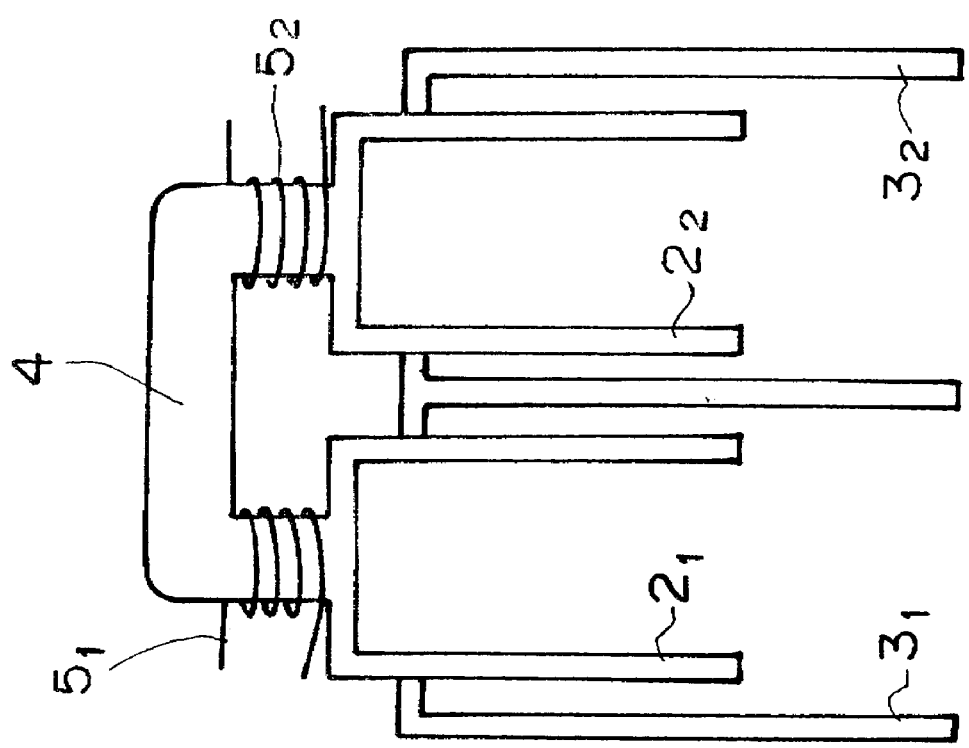

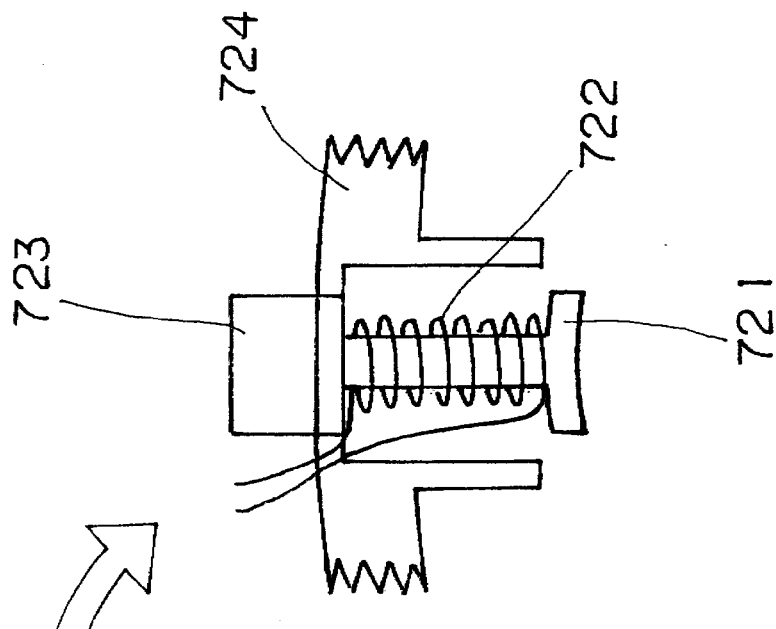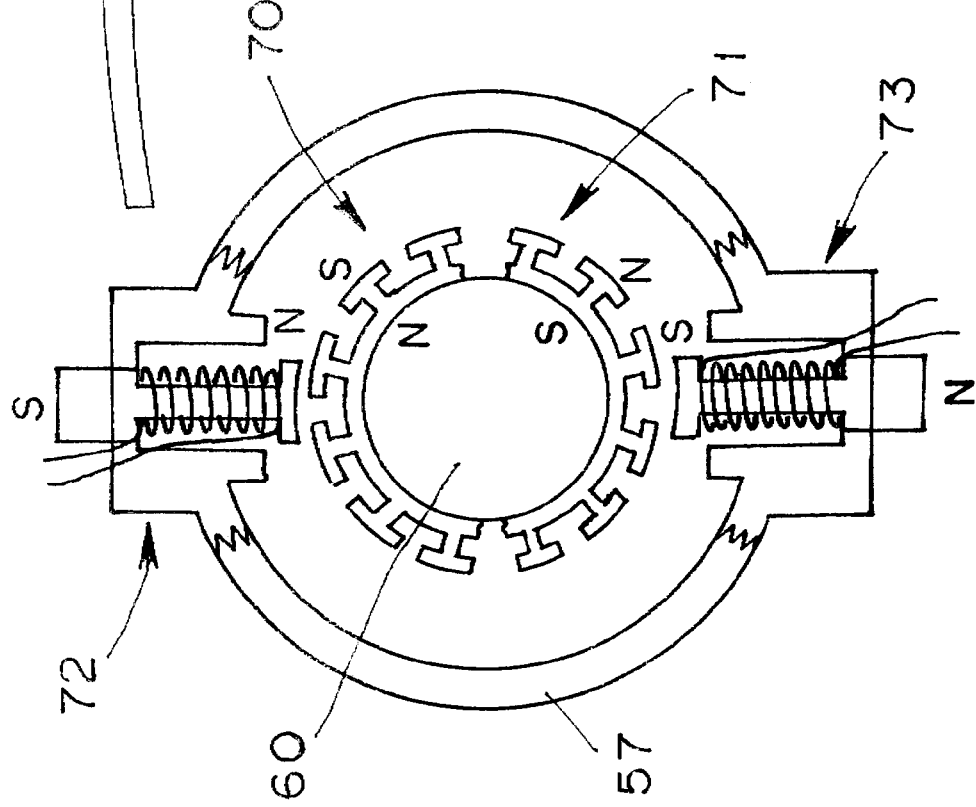
FIG.24B
FIG.24A

US 6,049,146

ELECTROMAGNETIC PISTON ENGINE

TECHNICAL FIELD

The present invention relates to an electromagnetic piston engine adapted to produce driving power by the electromagnetic force created by a reciprocal movement of a piston in a cylinder.

BACKGROUND TECHNOLOGY

In the recent years, the development of electric vehicles is exploding. Such electric vehicles use an electric drive motor as a power source. Conventional electric drive motors are designed to pick up rotational energy of a rotor as a power by directly rotating the rotor by electromagnetic force.

The electric drive motors of such a type, however, lead naturally to an increase in the weight of a rotor in order to pick up greater outputs and, as a consequence, suffer from the disadvantages that the weight of the portion corresponding to a rotary assembly section becomes heavy. The such electric drive motors require a power transmission mechanism for transmitting the driving power from a power source to the wheels to be designed to be adapted to the features of the such electric drive motors. Power transmission mechanisms for internal combustion piston engines, which have been generally used for conventional vehicles, cannot always be applied to electric vehicles as they are. These problems impose greater burdens upon the designing of electric vehicles.

For internal combustion piston engines, there are a variety of resistance that result from their structures. They may include, for example, (1) Air intake resistance of an air cleaner;
(2) Resistance of a cam shaft;
(3) Compression resistance in a cylinder;
(4) Resistance of a piston to an inner wall of a cylinder;
(5) Resistance of a cooling fan;
(6) Resistance of a water pump; and
(7) Resistance of an oil pump.

The loss of energy due to those resistances are the causes of reducing the energy efficiency of the internal combustion piston engines. An overall system assembly of the internal combustion piston engine further has the additional problem with an increase in the entire weight due to the necessity of installment of a mechanism for cooling the internal combustion piston engine because the internal combustion piston engine cannot avoid the generation of a considerably large amount of heat by the principles of the engine themselves.

Given the foregoing problems inherent in conventional internal combustion piston engines, the present invention has the object to provide an electromagnetic piston engine which can offer the effects of eliminating the various resistances inherent in the conventional internal combustion piston engines, reducing the weight corresponding to a rotary assembly section even if greater outputs can be taken, further making ready applications to power transmission mechanisms for use with conventional internal combustion piston engines, and achieving improved efficiency in utilizing energy.

DISCLOSURE OF THE INVENTION

The electromagnetic piston engine according to the present invention in one aspect comprises a cylinder and a piston, each made of a magnetic material, a cylinder electromagnet having an inner wall of the cylinder magnetizable to a one magnetic pole, and a piston magnetization unit for magnetizing a portion of the piston engageable with the cylinder to a single magnetic pole in a fixed manner, in which the piston is transferred in a one direction by creating a magnetic attraction force between the cylinder and the piston by exciting the cylinder electromagnet; and the piston is then transferred in the opposite direction by creating a magnetic repellent force therebetween, followed by repeating this series of the actions of alternately creating the magnetic attraction force and the magnetic repellent force to allow the piston to perform a reciprocal movement.

The electromagnetic piston engine according to the present invention in another aspect comprises a cylinder and a piston, each made of a magnetic material, a piston electromagnet having a one magnetic pole on a portion of the piston engageable with the cylinder, and a cylinder magnetization unit for magnetizing an inner wall of the cylinder to a single magnetic pole in a fixed manner, in which the piston is transferred in a one direction by creating a magnetic attraction force between the cylinder and the piston by exciting the piston electromagnet; and the piston is then transferred in the opposite direction by creating a magnetically repellent force therebetween, followed by repeating this series of the actions to allow the piston to perform a reciprocal movement.

The electromagnetic piston engine according to the present invention in a further aspect comprises the cylinder and the piston, each made of a magnetic material, the cylinder electromagnet having a one magnetic pole on the inner wall of the cylinder, and the piston electromagnet having a one magnetic pole on a portion of the piston engageable with the cylinder, in which the piston is transferred in a one direction by creating a magnetic attraction force between the cylinder and the piston by exciting the cylinder electromagnet and the piston electromagnet; and the piston is then transferred in the opposite direction by creating a magnetically repellent force therebetween, followed by repeating this series of the actions to allow the piston to perform a reciprocal movement.

The electromagnetic piston engine according to the present invention in a still further aspect is constructed by arranging a combination of the cylinder with the piston in -the aspects described above as a one assembly, arranging the one assembly in plural numbers and operating the plural assemblies in a parallel way, and converting a reciprocal movement of the piston in each of the plural assemblies into a rotary movement of a single crank shaft by a crank mechanism.

BRIEF DESCRIPTION OF THE ACCOMPANYING DRAWINGS

FIG. 4 is a table showing brief experimental results relating to magnetic force.

FIG. 9 is views showing outer poles of the non-contact type booster coil excitation mechanism of the electromagnetic piston engine according to the embodiment of the present invention.

FIG. 18 is a view showing another example of a mechanical rectifier according to the embodiment of FIG. 16.

FIG. 19 is views showing an electromagnet mechanism for two assemblies according to another embodiment of the present invention.

FIG. 24 is a view showing a non-contact type two-part ring in a non-contact type rotary switch.

BEST MODES OF CARRYING OUT THE INVENTION

The present invention will be described in more detail by way of examples with reference to the accompanying drawings.

Figure 1:
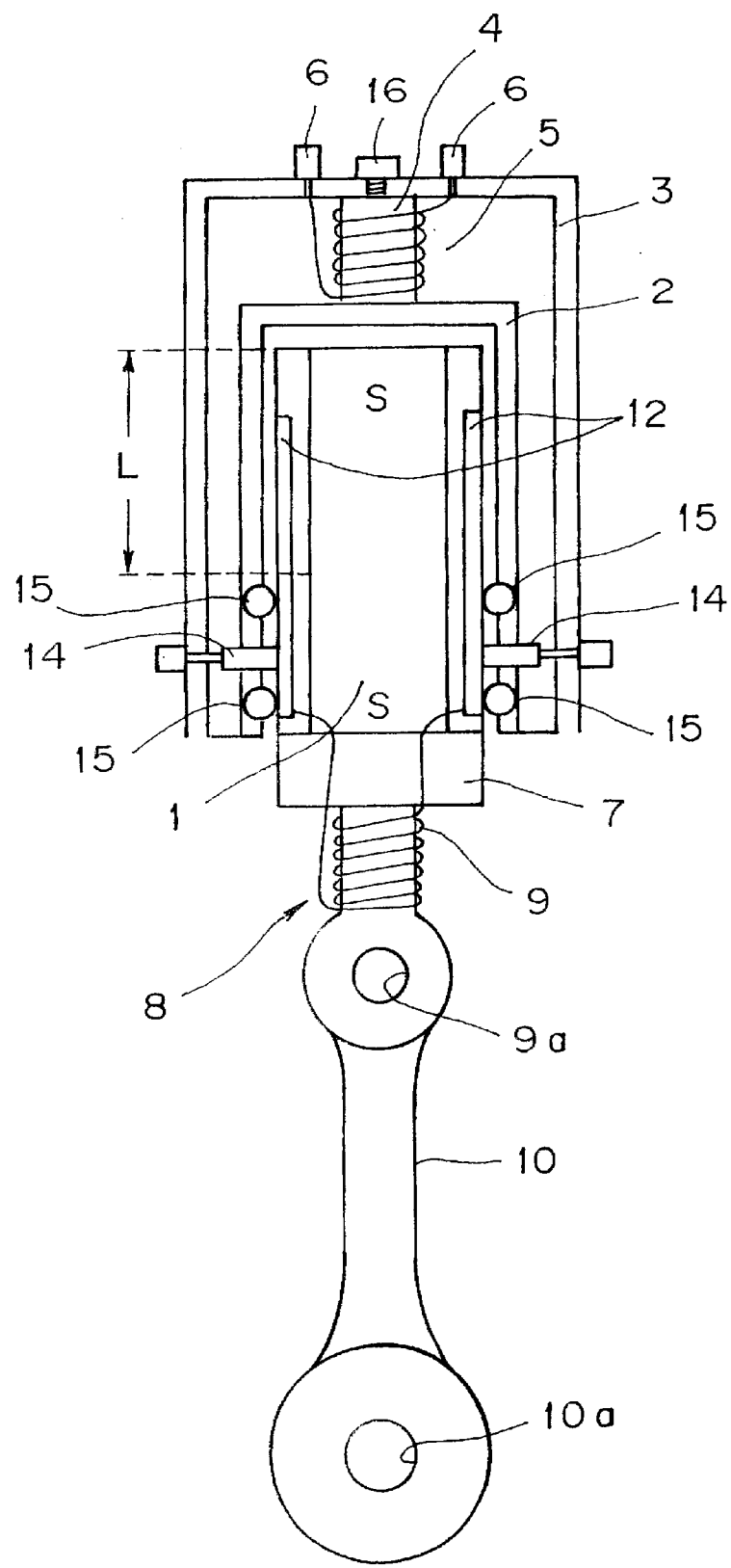
FIG. 1 is a transverse view in section showing a electromagnetic piston engine according to an embodiment of the present invention.
Figure 2:
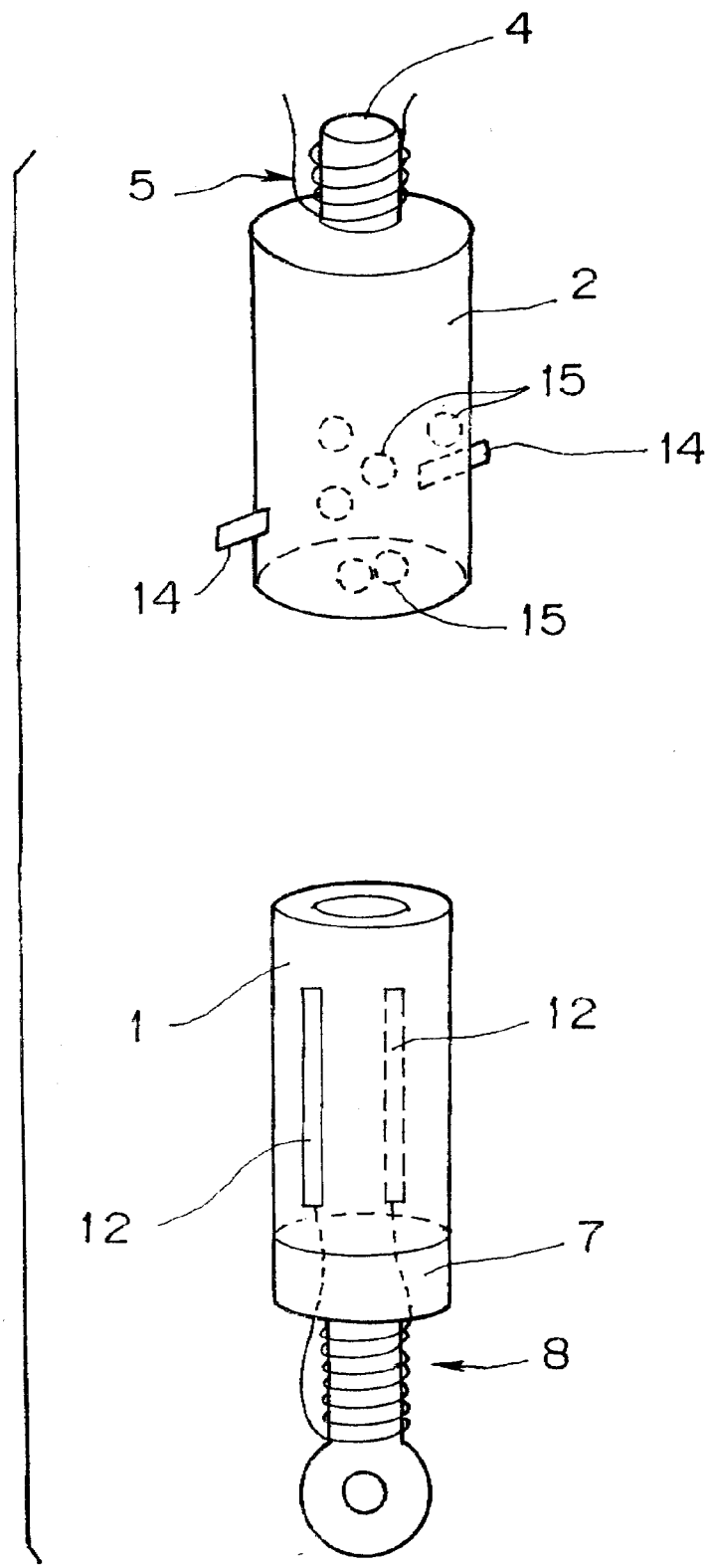
FIG. 2 is views showing an appearance of a cylinder portion and a piston portion of the electromagnetic piston engine according to the above embodiment of the present invention.

FIG. 1 is a transverse view in section showing an example of the electromagnetic piston engine according to the present invention. FIG. 2 shows an appearance of the cylinder and piston portion of the electromagnetic piston engine. In FIG. 1, reference numeral 1 stands for a piston, reference numeral 2 for a cylinder, reference numeral 3 for an outer cylinder, and reference numerals 4 and 9 each for a connecting portion, each made of a silicon steel plate. The cylinder 2 and the outer cylinder 3 are each of a shape having its top portion closed. An outer wall at the top portion of the cylinder 2 is formed integrally with a connecting portion 4. The cylinder 2 is disposed in the interior of the outer cylinder 3 with the connecting portion 4 arranged so as to come into abutment with an inner wall at the top portion of the outer cylinder 3. The connecting portion 4 is fixed to the top portion of the outer cylinder 3 with a mounting screw 16. An exciting coil 5 is wound about the connecting portion 4. On an outer side of the top portion of the outer cylinder 3 are mounted two electrodes 6 which in turn pass over the entire length to the inner wall side of the outer cylinder 3 and are connected to lead wires at the both ends of the exciting coil 5, respectively, to excite the exciting coil 5 through the electrode 5.

The piston 1 is of a hollow shape which has an opening on a one side thereof and has a permanent magnet 7 fixed on a base end side thereof so as for the S pole side to be directed to the base end surface of the piston. To the surface of the N pole side of the permanent magnet 7 is fixed a connecting portion 9. An axial hole 9a of the connecting portion 9 is supported axially with a crank shaft of a connecting rod 10 which in turn is axially supported at an axial hole 10a on its other end with a crank mechanism (not shown). The connecting portion 9 is wound with an exciting coil 8 for a booster (herein referred to as "booster coil"). The lead wires on the both sides of the booster coil 8 are connected each to a copper plate electrode 12 embedded extending in the axial direction on the outer wall side surface of the piston.

The piston 1 is supported in the interior of the cylinder 2 with a bearing 15 to enable a smooth reciprocal movement (vertical movement) in the axial direction of the cylinder. The piston 1 is arranged to reciprocally move in the distance indicated by "L" in the drawing. The bearing 15 is disposed each in the upper and lower positions along a circumferential direction of the inner wall of the cylinder 2 (i.e. the outer wall of the piston 1) and is made of ceramics so as for the piston 1 to fail to be connected magnetically to the cylinder 2. The bearing 15 may be replaced with a so-called roller.

Figure 3:
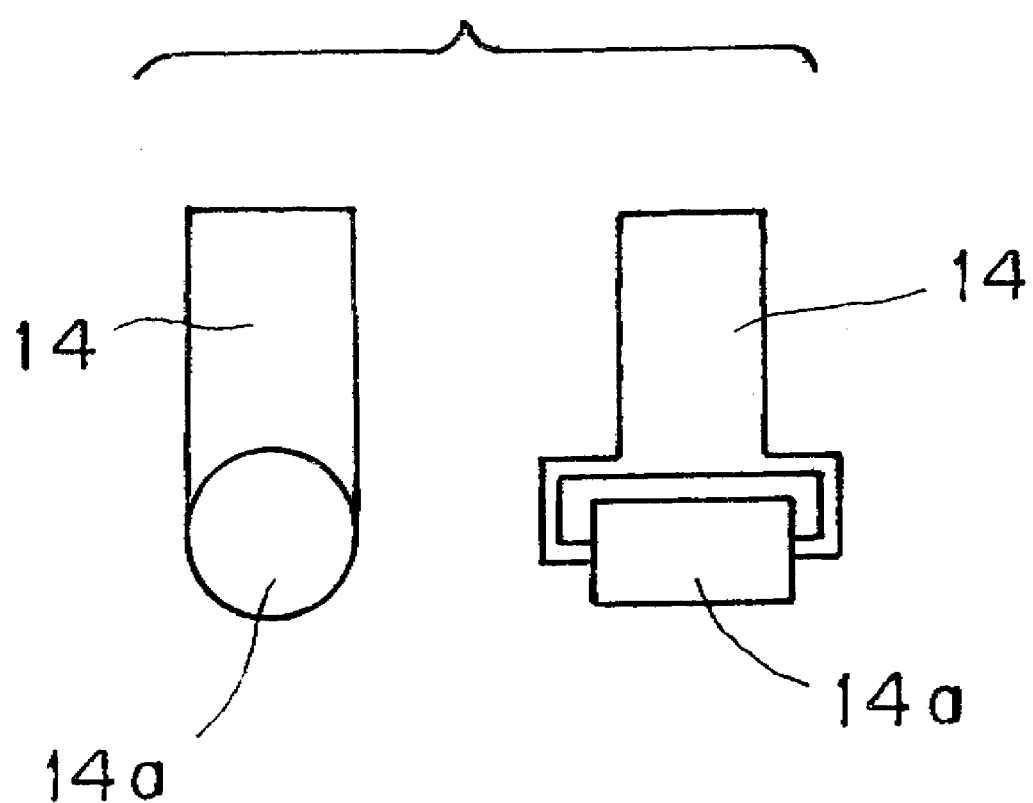
FIG. 3 is views showing a variation of a brush according to the embodiment of the present invention.

The cylinder 2 has a brush electrode 14 (hereinafter referred to simply as "a brush") pass therethrough over its whole length from its outer wall side to its inner wall side and a topside end of the brush 14 is disposed to come slidably into contact with the copper plate electrode 12. The other topside end of the brush 14 is further disposed to pass all the way through the outer cylinder 3 so as to permit a flow of current from the outside. The brush 14 may be made of carbon and the topside end portion of the brush 14 may be formed in the shape of a so-called roller to reduce wear by the sliding movement. FIG. 3 shows an example of the brush 14 formed at its topside end portion in the shape of such a so-called roller. As shown in the drawing, the brush 14 is mounted at its topside end portion with a cylinder-shaped electrode 14a so as to be rotatable and the cylinder-shaped electrode 14a is disposed to come into contact with the surface of the copper plate electrode 12 while being rotated.

It is to be understood that a contact mechanism for feeding electricity to the booster coil 8 in accordance with the present invention is not restricted to a contact mechanism with the copper plate electrode 12 and the brush 14 and a variety of contact mechanisms may include, for example, such as a slidable contact mechanism in which the connecting rod 10 is made hollow, the lead wire of the booster coil 8 passes through the hollow portion of the connecting rod 10, a ring electrode is mounted on the crank shaft side so as to make a turn in the circumferential direction of a crank shaft, and a brush is disposed to slide together with the ring electrode.

Now, the actions of the electromagnetic piston engine will be described hereinafter.

In operation of the electromagnetic piston engine, a current is fed through the booster coil 8 in the direction in which the magnitude of the magnetic pole of the permanent magnet 7 is increased. Although the piston 1 moves reciprocally in the cylinder 2 in a manner as will be described hereinafter, the feeding of electricity to the booster coil 8 can be performed by supplying a current to the copper plate electrode 12 through the sliding copper plate electrode 14. This feeding can excite the whole area of the piston 1 to the S pole by the magnetic forces of the permanent magnet 7 and the booster coil 8.

The excitation of the exciting coil 5 can be performed in a manner as will be described hereinafter. A current is fed in the direction of exciting the cylinder 2 to the S pole and the outer cylinder 3 to the N pole during a period of time during which the piston 1 moves from the top dead center to the bottom dead center (in the direction from bottom to top in the drawing). On the other hand, the current is fed in the direction of magnetizing the cylinder 2 to the N pole and the outer cylinder 3 to the S pole during a period of time during which the piston is being directed to the top dead center from the bottom dead center (from to the top from the bottom in the drawing). The feeding of the exciting current is performed repeatedly in a periodical way.

By exciting the exciting coil 5 in the manner as described hereinabove, the S pole of the piston 1 and the N pole of the cylinder 2 become attracting each other during the time during which the piston 1 moves toward the top dead center from the bottom dead center, thereby raising the piston 1 toward the top dead center by the attracting force. As the piston 1 has reached the top dead center, the exciting current of the exciting coil 5 is inverted. The inversion of the exciting current then excites the cylinder 2 to the S pole to repel the S pole of the piston 1 and the S pole of the cylinder 2 from each other and the repellent force pushes down the piston 1 downwardly toward the bottom dead center. As the piston 1 has reached the bottom dead center, the exciting current of the exciting coil 5 is inverted again. This repetitive actions create a reciprocal movement of the piston 1 in the cylinder 2 and the reciprocal movement is then converted into a rotary movement of a crank shaft 11 through the connecting rod 10.

FIG. 4 shows brief experimental results for a description on the magnetic forces that are created with the exciting coil 5 on the side of the cylinder 2. This experiment has been carried out using an iron nail having a diameter of 3 mm and a length of 65 mm as an iron core by winding a coil having a set size on the nail in a predetermined number of windings and by feeding a current by a direct voltage of 10 volts. Measurement has been made by inspecting the magnitude of a magnetic force in each case by adjusting the magnitude of the current with a variable resistance and the like. In the drawing, there are indicated the sectional area ($mm^2$), the number of windings, the fed current value (A), and the created magnetic force (g), with respect to each size (mm) of the exciting coil 5. As the magnitude of the magnetic force of the coil is generally determined by the multiplication of the exciting current by the number of windings, the experimental results indicate as a matter of course that the magnetic force becomes greater as the number of windings is larger or as the exciting current is greater.

As is apparent from the experimental results, the electromagnetic piston engine according to the present invention can create great magnetic forces (attracting force and repellent force) between the cylinder 2 and the piston 1 when the number of windings on the exciting coil 5 is sufficiently large even if the exciting current would be low. The electromagnetic piston engine according to the present invention causes no problems even if the number of windings is extremely large because it can readily ensure a sufficiently greater space for winding the exciting coil 5 from the structural point of view as compared with conventional electric motors or the like. Further, it is very advantageous from the energy-saving point of view because it can create a greater magnetic force, that is, a driving force, by a smaller current, that is, a lower consumption power, than those conventional electric motors.

As it generates the magnetic force acting in the axial direction of the piston, the electromagnetic piston engine according to the present invention can also pick up a greater magnetic force from this point of view. More specifically, usual electric motors are arranged for a rotor to rotate by the magnetic force between the rotor and a stator, which is acting in the circumferential direction of the rotor, so that the way of applying the magnetic force is not always effective. On the other hand, as the electromagnetic piston engine according to the present invention utilizes the magnetic force in the axial direction of the electromagnet in which the magnetic force of the electromagnet becomes the strongest as it is for a reciprocal movement of the piston 1, it can use the magnetic force in a very efficient way.

Figure 5:
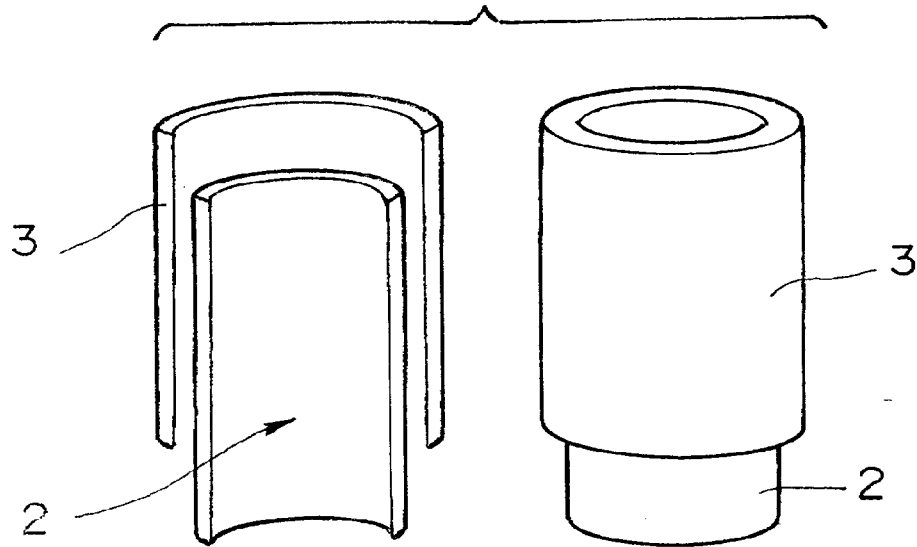
FIG. 5 is views showing a cylinder and piston assembly according to the embodiment of the present invention.
Figure 6:
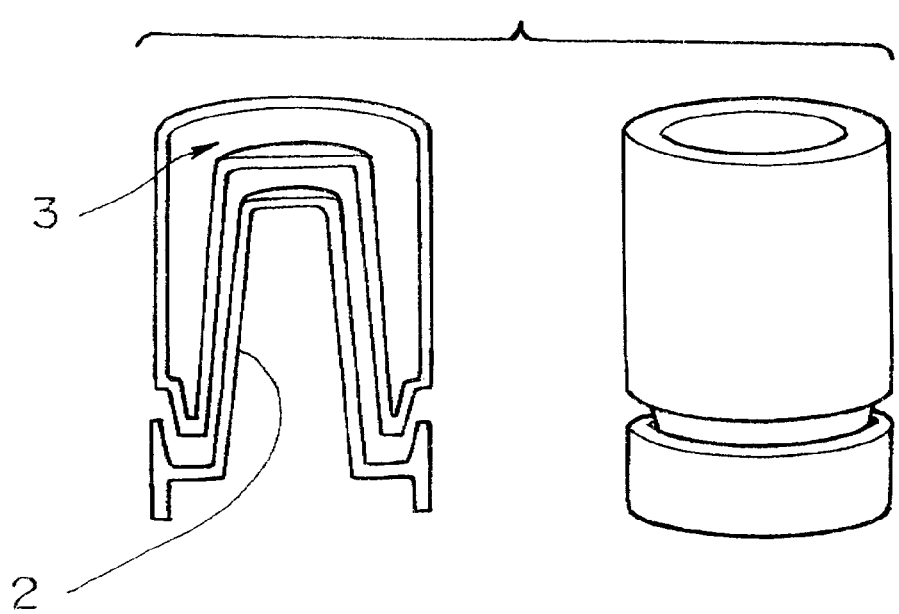
FIG. 6 is views showing a variation in a cylinder and piston assembly according to the embodiment of the present invention.

The electromagnetic piston engine as shown in FIG. 1 can take a variety of modifications. Although it takes a configuration as in an embodiment, for example, in which the piston 1 is in a hollow shape and its topside end portion is open, as shown in FIG. 5, the shape of the piston 1 is not limited to the such shape and may include embodiments, for example, in which the piston 1 is of a shape with its topside end portion is closed and in which the piston is of the form of a truncated cone and hollow on the inside, as indicated in section by FIG. 6. The cylinder can also be made hollow on the inside so as to adapt to the shape of the piston 1. It is also possible to enhance the magnetic force at a predetermined location by selecting the shapes of the piston and/or the cylinder in an appropriate way. Moreover, although the piston is made hollow in order to make it lightweight, it may also be made of a solid mass of iron or a silicon steel plate. In this case, the piston can be provided in itself with the actions as a flywheel mounted on a crank shaft of a usual internal combustion type piston engine.

Although the outer cylinder 3 is disposed outside the cylinder 2 in the above embodiment, it is not always required to locate the outer cylinder 3 outside the cylinder 2 and the cylinder 2 is not limited to the shape in the above embodiment as long as it is made of a magnetic material in an amount sufficient enough to enable the formation of a one magnetic pole on the side sandwiched with the exciting coil 5 when the cylinder 2 is excited to the other magnetic pole.

Further, in the above embodiment, the piston is excited to a one magnetic pole in a fixed manner with the permanent magnet and the booster coil. In accordance with the present invention, the piston may also be excited to a one magnetic pole in a fixed manner with a permanent magnet or an electromagnet alone.

Figure 7:
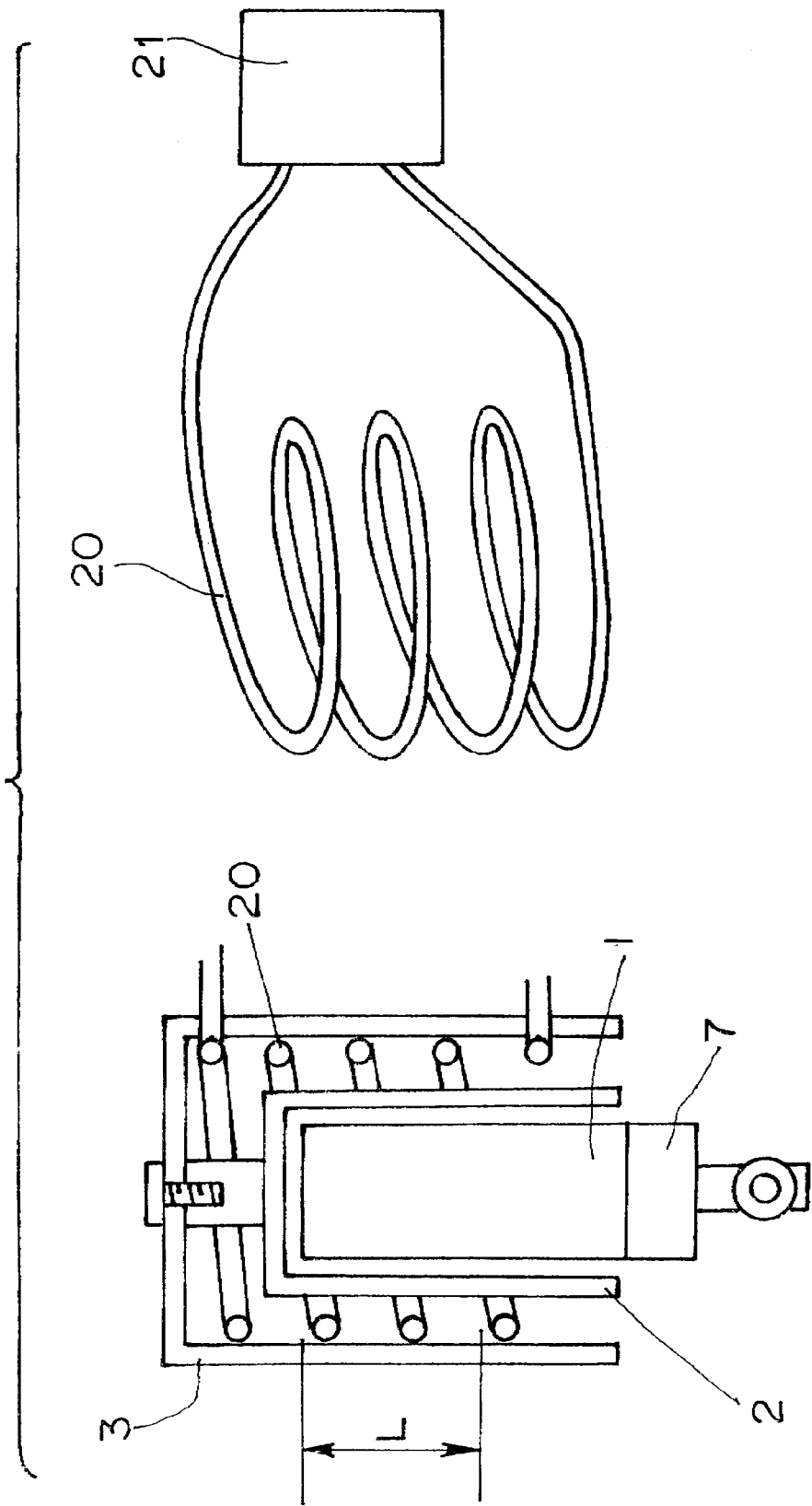
FIG. 7 is views showing a cooling device according to the embodiment of the present invention.

Moreover, when a great amount of heat generates at the portion of the exciting coil 5, the exciting coil 5 may be cooled by locating a cooling pipe 20 between the cylinder 2 and the outer cylinder 3, as shown in FIG. 7, and circulating a cooling liquid from a cooling unit 21.

Figure 8:
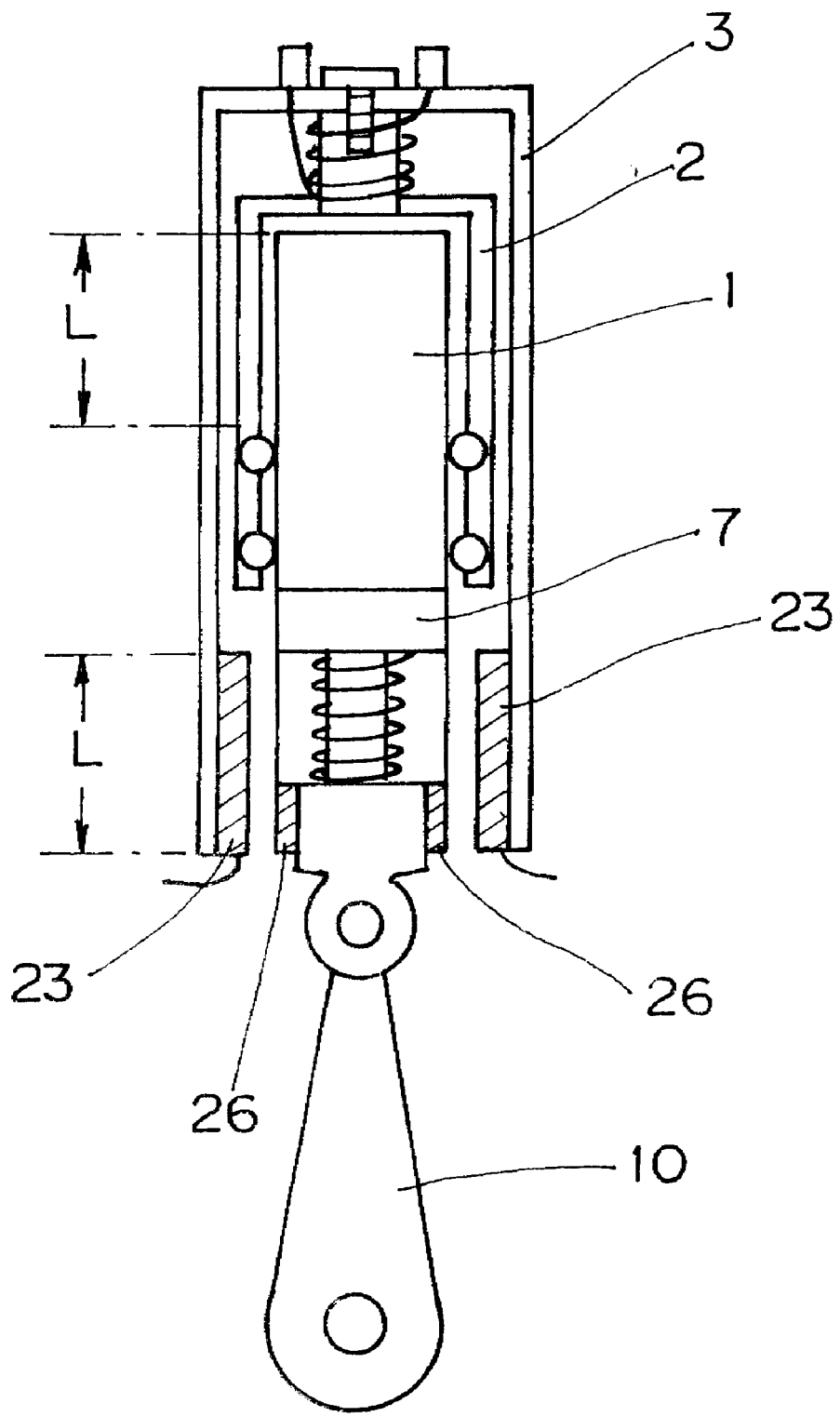
FIG. 8 is a view showing a non-contact type booster coil excitation mechanism of the electromagnetic piston engine according to the embodiment of the present invention.

In addition, in the above embodiment, the feeding of electric power to the booster coil 8 is performed by allowing the brush 14 to slidably come into contact with the copper plate electrode 12, however, the way of feeding electric power is not limited to this mode of feeding. The feeding may also be performed in a non-contact manner by utilizing electromagnetic induction. The embodiment as shown in FIG. 8 indicates an example in which a side wall of the outer cylinder 3 is disposed extending in a length longer than the length of the cylinder 2 and an outer pole 23 is disposed on an inner wall surface thereof and, on the other hand, an inner pole 26 on the side of the piston 1 is disposed beneath the booster coil 8.

As shown in FIG. 9(A), the outer pole 23 may take a cylindrical shape having a length L in which the piston 1 is movable reciprocally and be made of a magnetic material such as a silicon steel plate or the like. As shown in FIG. 9(B), the outer pole 23 may be of a shape in which a number of projecting poles 24 are disposed projecting toward the inside. Further, as shown in FIG. 9(D), each of the projecting pole 24 may be divided into plural pole parts extending in the axial direction of the cylinder or may be of one linear shape extending in the axial direction thereof. Moreover, as shown in FIG. 9(C), each of the projecting poles 24 is wound with a coil 25. In this example, the coils 25 of the projecting poles 24 are arranged in series with each other and the directions of winding the coils are identical to each other. Therefore, the flow of an exciting current through the coils 24 can excite all the inner top end sides of the projecting poles 24 (i.e. the inner side surface of the outer pole 23) to the S pole and all the base end sides of the projecting poles 24 (i.e. the outer side surface of the outer pole 23) to the N pole.

Figure 10:
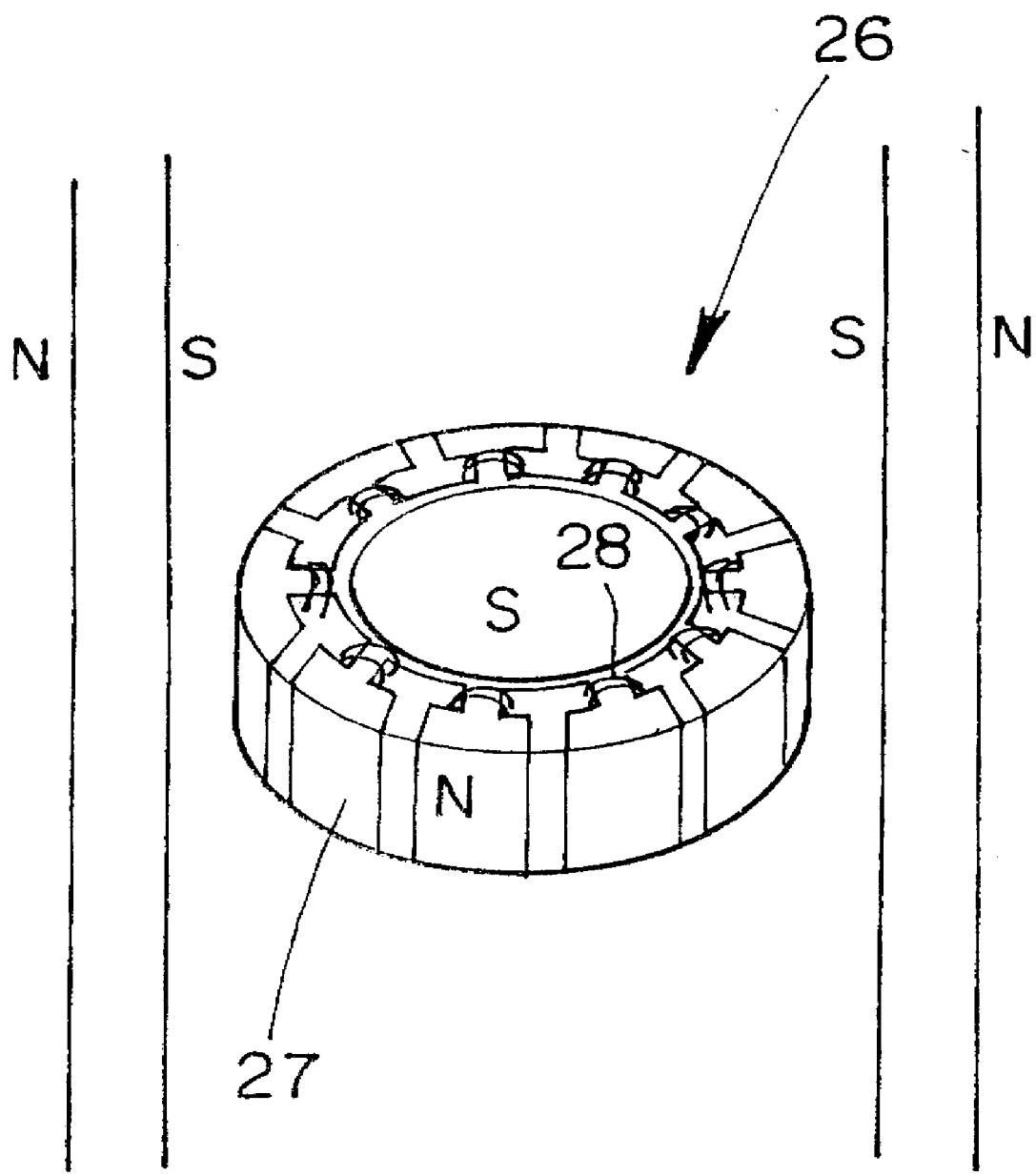
FIG. 10 is a view showing inner poles of non-contact type booster coil excitation mechanism of the electromagnetic piston engine according to the embodiment of the present invention.

On the other hand, as shown in FIG. 10, the inner pole 26 may be of a ring shape and be made of a magnetic material such as a silicon steel plate. The inner pole may comprise a number of projecting poles 27 projecting toward the outside. Each of the projecting poles 27 is wound with a coil 28 in the identical direction and the coils 28 are connected to each other in series. The both ends of the in-line coils 28 are connected to lead wires at the respective ends of the booster coil 8.

With the above arrangement of the construction in which the outer pole 23 is mounted on the side of the outer cylinder 3 and the inner pole 26 is mounted on the side of the piston 1, a direct current is induced through the coil 28 of the inner pole 26 by the electromagnetic induction to the inner pole 26 from the outer pole 23 when the piston 1 is transferred reciprocally while flowing the exciting current through the coils 25 of the outer pole 23. The direct current induces flows to the booster coil 8 and enhances the magnetic force of the permanent magnet 7. It is also to be noted herein that, although the coil is wound about each of the projecting poles 24 in the identical direction in the above embodiment, the present invention is not limited to this direction of winding and the coils may be wound alternately on the adjacent projecting poles in an inverted manner. In this case, as an alternate current is induced through the coils 28 of the inner pole 26, the induced current may be fed to the booster coil 8 through a rectifier.

Figure 11:
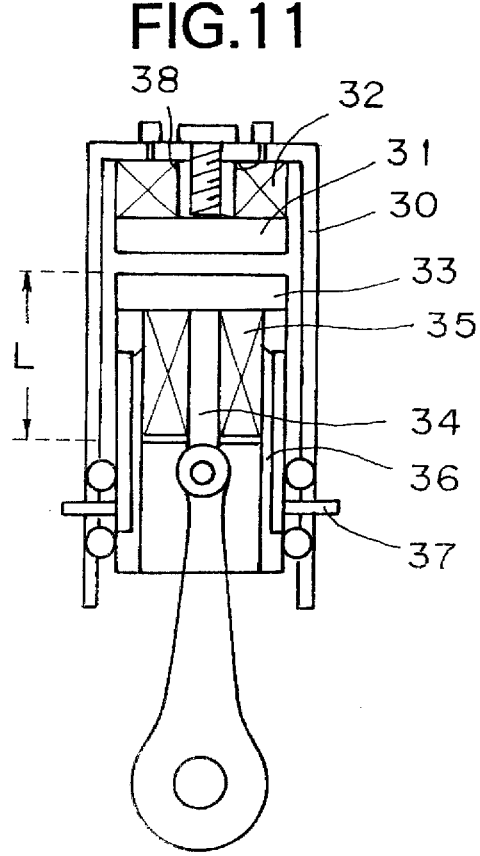
FIG. 11 is a view showing an electromagnetic piston engine according to another embodiment of the present invention.

Further, the present invention is not limited to the specific configurations of the cylinder and the piston as described in the above embodiments and may encompass embodiments within the scope of the invention, for example, as shown in FIG. 11, in which a cylinder 30 is made of a magnetic material, a magnetic pole 31 is disposed on the top end side in the cylinder 30, and a connecting portion 38 thereof is wound with an exciting coil 32. In this embodiment, a permanent magnet 33 of a disc shape may be used as a piston and a bottom end side of the permanent magnet 33 is supported axially with a connecting rod through a connecting bar 34. The connecting bar 34 is disposed winding a booster coil 35 for enhancing magnetic force and current is fed to the booster coil 35 through a copper plate electrode 36 and a brush 37, thereby magnetizing an exciting coil 32 and arranging the magnetic pole 31 so as to be shifted alternately to the S pole and the N pole to move the piston reciprocally.

Figure 12:
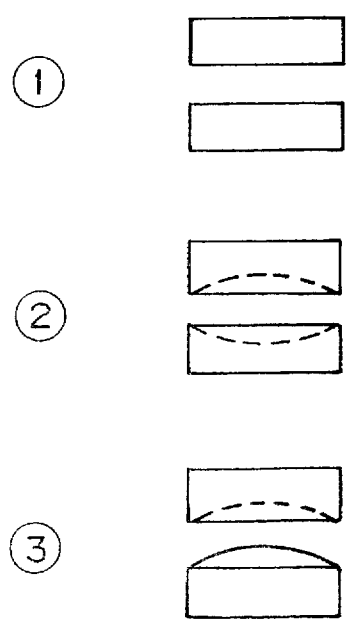
FIG. 12 is views showing examples of engagement of a cylinder with a piston.

Each of the surfaces facing the inner wall on the topside end portion of the cylinder and the topside end portion of the piston may be made flat as shown in FIG. 12(1) or curved inwardly toward the center of each of the members as shown in FIG. 12(2) or curved outwardly for one of the members and inwardly for the other of the members as shown in FIG. 12(3).

In another embodiment, an outer circumference of the cylinder 2 may be wound directly with an exciting coil.

In the embodiments of the present invention, the attracting force and the repellent force are acted on the piston to cause the piston to move reciprocally by inverting the current through the exciting coil 5 disposed on the cylinder side. It is as a matter of course to be noted herein that the present invention is not limited to the specific mode as described hereinabove and may include other variations. In a variation, for example, a combination of a permanent magnet with a booster coil is disposed on the cylinder side and excited to a one magnetic pole in a fixed manner while an exciting coil is disposed on the piston side and current passing through the exciting coil is inverted to create the attracting force and the repellent force and allow them to act on the piston to provide the piston with a reciprocal movement. In another embodiment, the combination of the permanent magnet with the booster coil on the cylinder side may be replaced with an permanent magnet only or an electromagnet only. Further, in another embodiment, when both of the cylinder side and the piston side are constituted each by an electromagnet only, the excitation of the exciting coil for each electromagnet may be controlled in various manner so as to permit the repellent force and the attracting force to alternately act between the piston and the cylinder.

Figure 13:
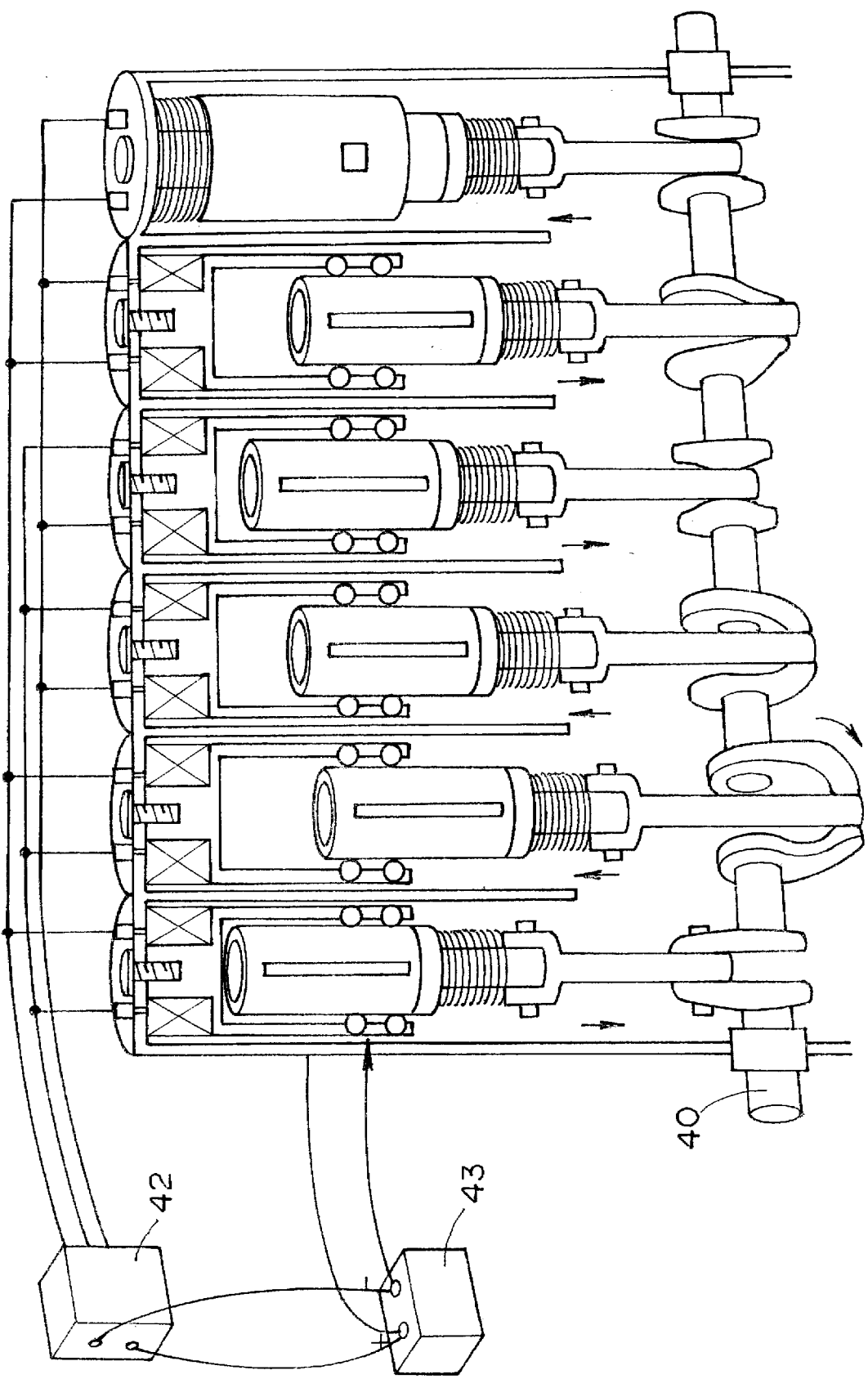
FIG. 13 is a view showing an electromagnetic piston engine having a 6-series assembly according to an embodiment of the present invention.

FIG. 13 shows an embodiment in which the electromagnetic piston engine according to the present invention is constituted by a combination of a plurality of electromagnetic piston engines. In the following description, a combination of one cylinder with one piston is referred to as an assembly for convenience of explanation. This embodiment referred to herein indicates an electromagnetic piston engine of six assemblies. As shown in the drawing, the six assemblies are disposed in series and the outer cylinder 3 of each assembly is magnetically connected to each other. In the following description, the six-series assemblies are referred to in a numerical order from the left-hand side to the right-hand side in the drawing for brevity of explanation, that is, they are referred to as from a first assembly for the assembly located on the most left-hand side through a second assembly, a third assembly, a fourth assembly, and a fifth assembly to a sixth assembly for the most right-hand side.

For each of the first-to-sixth assemblies, the permanent magnet 7 is disposed and the booster coil 8 is excited so as to excite the topside end of the respective piston 1 to the S pole. The pistons of the first-to-sixth assemblies are arranged in such a way that they are mounted each on a crank shaft 40 in an equally angularly spaced relationship at the top dead center of a 60 degree crank angle from each other with reference to the first assembly (0 degree). In this case, a phase difference of the crank angles between the first and second assemblies and between the third and fourth assemblies and between the fifth and sixth assemblies each is set each to 180 degree. Further, a phase difference of the crank angles between the first and third assemblies and between the third and fifth assemblies each is set to 120 degree. The crank shaft 40 is rotatably supported on the main body of the engine with a bearing 41.

To each exciting coil 5 of the first-to-sixth assemblies is supplied an exciting current from an inverter 42 which converts the direct output from a battery 43 into a three-phase alternating output and supplies it to each of the exciting coils 5. The frequency of the three-phase alternating output can be altered with freedom. To each of the booster coils 8 of the first-to-sixth assemblies is supplied a direct current from the battery 43 through the brush 14. The direct current is supplied to excite the topside end of the piston 1 of each assembly to the S pole.

Figure 14A:
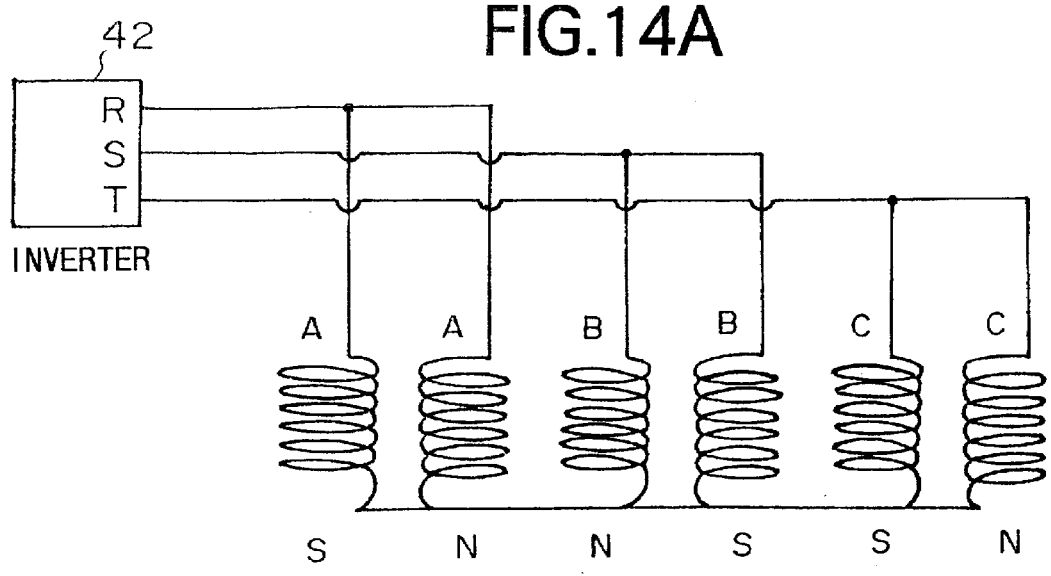
FIG. 14 is views for describing a procedure of driving the electromagnetic piston engine with a 6-series assembly by a three-phase alternating electric power.
Figure 14B:
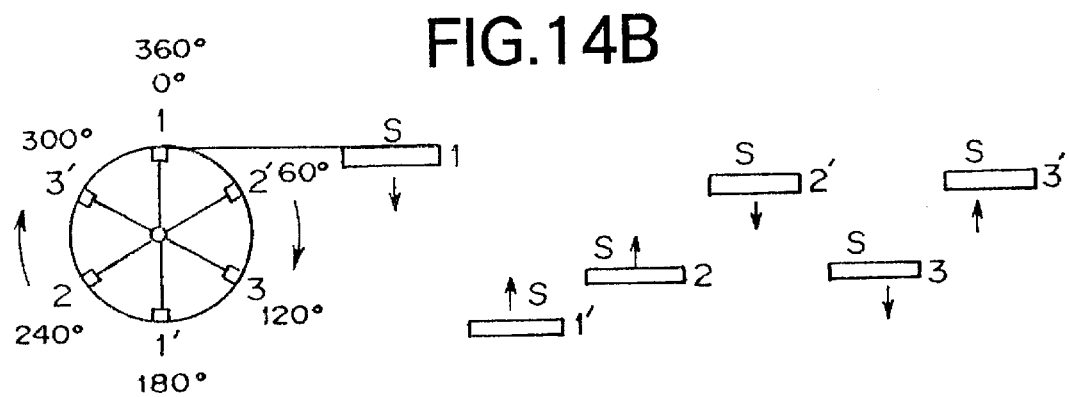
Figure 14C:
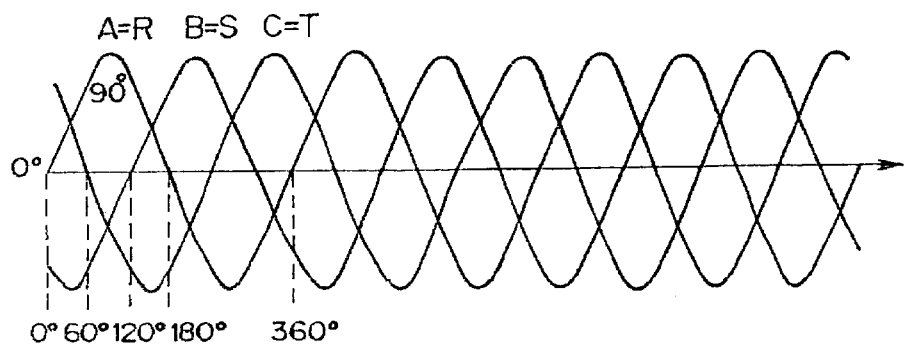

FIG. 14(A) indicates the procedure of feeding electric power to each exciting coil 5 from the inverter 42. As shown in the drawing, the R-S phase of the three-phase alternating output is connected to the exciting coils 5 of the first and second assemblies in an inverted manner from each other, the S-T phase of the three-phase alternating output is connected to the exciting coils 5 of the third and fourth assemblies in an inverted manner from each other, and the T-R phase of the three-phase alternating output is connected to the exciting coils 5 of the fifth and sixth assemblies in an inverted manner from each other. FIG. 14(B) indicates the position of each piston of the first-to-sixth assemblies relative to the crank angle with reference to the first assembly (0 degree). FIG. 14(C) shows a relationship of the three-phase alternating output with the crank angle.

When the exciting coils 5 are connected in the manner as described hereinabove, the exciting current flows through the exciting coil 5 in each assembly in the maximal magnitude at the central position of the reciprocal movement of each piston and allows its flow direction to be inverted at the top dead center or the bottom dead center of the piston. As a consequence, for example, at the crank angle of 0 degree, both of the attracting force and the repellent force start working on the first and second assemblies at the crank angle close to 0 degree, both of the attracting force and the repellent force which are increasing close to their respective peak values are working on the third and fourth assemblies, and both of the attracting force and the repellent force which are decreasing close to their respective peak values are working on the third and fourth assemblies. Also, for example, at the crank angle of 60 degree, both of the attracting force and the repellent force which are increasing close to their respective peak values are working on the first and second assemblies, both of the attracting force and the repellent force which are decreasing close to their respective peak values are working on the third and fourth assemblies, and both of the attracting force and the repellent force start working on the fifth and sixth assemblies at the crank angle close to 0 degree. By taking advantage of the relationship of the attraction with the repulsion, which shift the first-to-sixth assemblies in the order in accordance with the crank angle, a periodical cycle of the reciprocal movement of the piston of each assembly can be synchronized with the frequency of the three-phase alternating current smoothly in substantially the same manner as the principles of a synchronous motor. Therefore, by variably controlling the frequency of the three-phase alternating current generated by the inverter 42, the number of revolutions of the electromagnetic piston engine can be variably controlled in accordance with the frequency of the two-phase alternating current.

Figure 15A:
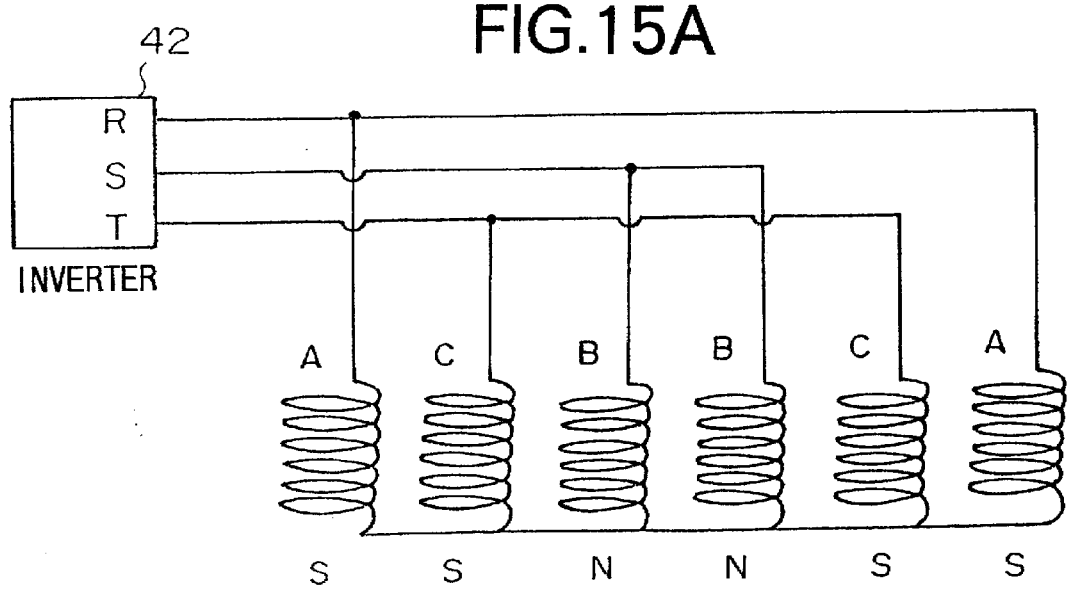
FIG. 15 is views for describing another procedure of driving the electromagnetic piston engine with 6-series assemblies by a three-phase alternating electric power.
Figure 15B:
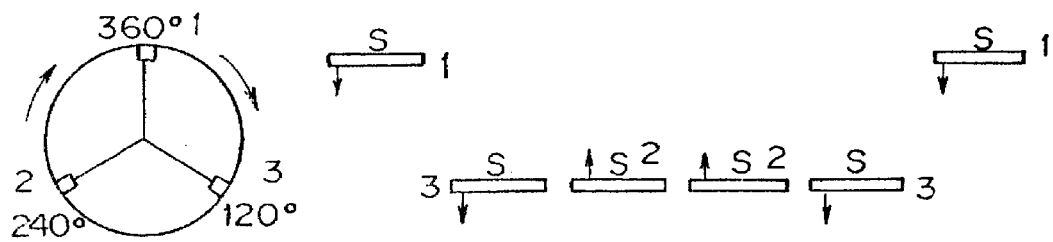
Figure 15C:
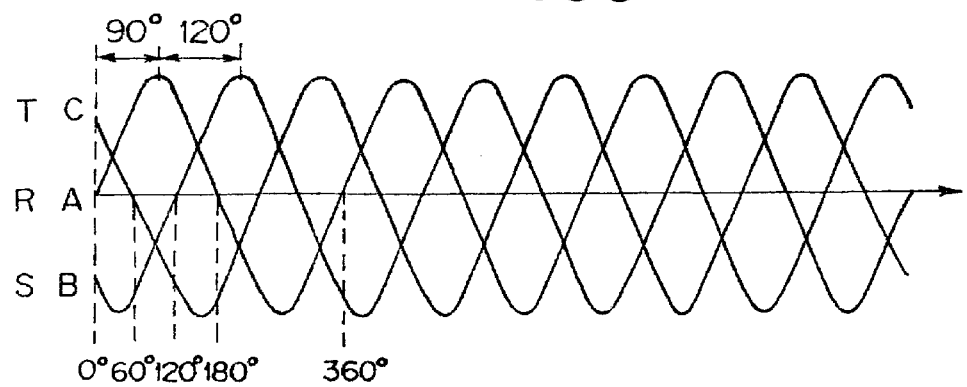

It is to be understood herein that, in the above embodiment, the position of each piston of the first-to-sixth assemblies relative to the crank angle is deviated at the crank angle of every 60 degree, however, as a matter of course, the present invention is not limited to this specific mode. For instance, as shown in FIG. 15, the piston positions of two cylinders may be set each to an identical crank angle as adopted in many recent piston engines of a 6-cylinder internal combustion type. More specifically, for instance, as shown in FIG. 15, when the piston position of the first assembly is set to 0 degree, the piston position of the six assembly is set to the same crank angle as that of the first assembly, the piston positions of the second and fifth assemblies are set to the crank angle of 120 degree, and the piston positions of the third and fourth assemblies are set to the crank angle of 240 degree. The exciting coil 5 of each of the first-to-sixth assemblies is excited in accordance with the crank angles set in the manner as described hereinabove.

Figure 16:
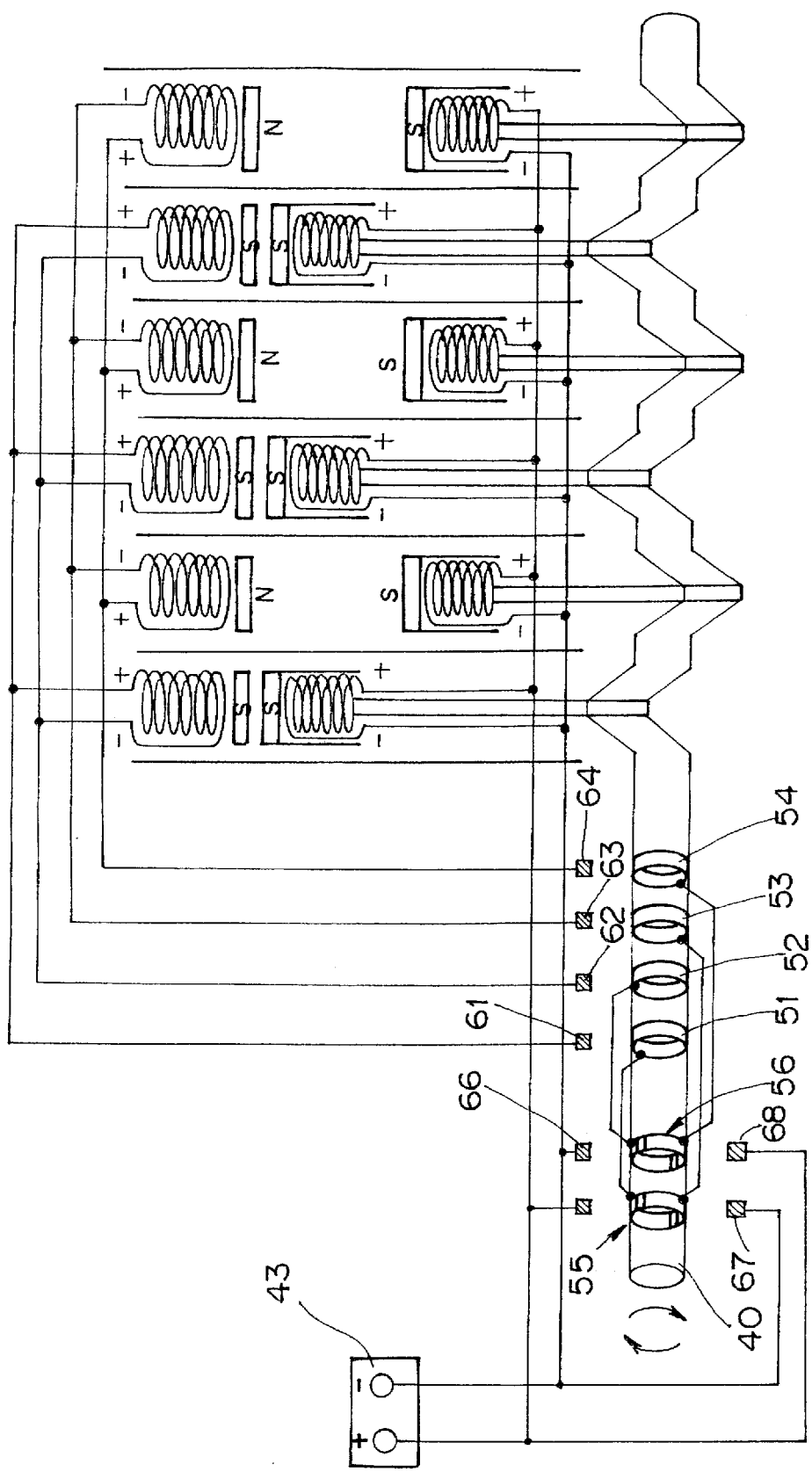
FIG. 16 is views for describing a procedure of driving the electromagnetic piston engine with 6-series assemblies by a battery using a mechanical rectifier.
Figure 17:
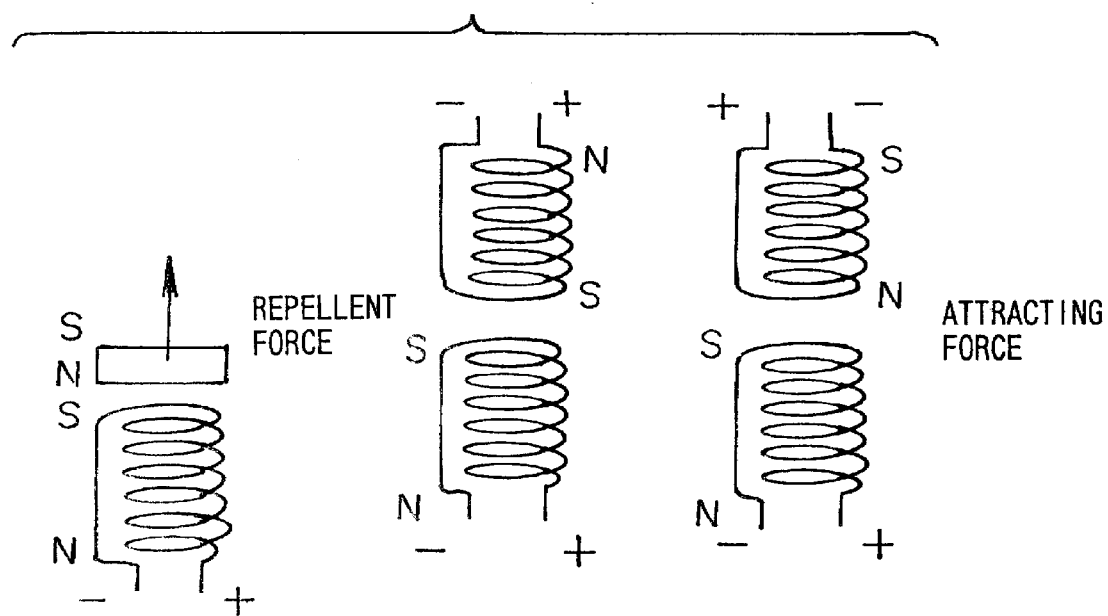
FIG. 17 is views for describing directions of excitation currents of an exciting coil according to the embodiment of FIG. 16.

FIG. 16 shows another embodiment of an electromagnetic piston engine of a six-assembly type. FIG. 17 indicates a polarity of an exciting current through the exciting coil 5 in order to generate the S pole or the N pole in the cylinder 2 with respect to a polarity of the magnetic pole of the piston 1. This embodiment indicates a procedure in which no three-phase alternating current is fed to the exciting coil 5. In this embodiment, the first, third and fifth assemblies are set in the identical piston positions, that is, at the identical crank angles, while the second, fourth and sixth assemblies are set in the identical piston positions. Further, the piston positions of the first, third and fifth assemblies are inverted from the piston positions of the second, fourth and sixth assemblies.

On the crank shaft are mounted six ring-shaped electrodes 51 to 56, inclusive, and the electrodes 51 to 54 each are not divided while the electrodes 55 and 56 are each divided in a diameter direction into a two-part ring. Each of the tow-part ring electrodes 55 and 56 is divided at the identical crank angle into two ring parts 55a and 55b as well as two ring parts 56a and 56b, respectively.

The ring electrodes 51 to 54 are disposed to slidably come into contact with the brushes (electrodes) 61 to 64, respectively. The brush 61 is connected to the exciting coil 5 of each of the first, third and fifth assemblies and likewise the brush 62 is connected to the exciting coil 5 of each of the first, third and fifth assemblies. On the other hand, the brush 63 is connected to the exciting coil 5 of each of the second, fourth and sixth assemblies and likewise the brush 64 is connected to the exciting coil 5 of each of the second, fourth and sixth assemblies. The two-part ring electrode 55 is disposed so as to slidably come into contact with the brushes 65 and 67 in the line across the diameter while the two-part ring electrode 56 is disposed so as to slidably come into contact with the brushes 66 and 68 in the line across the diameter. The brushes 65 and 68 are in turn connected each to a terminal with plus (+) polarity of the battery and the brushes 66 and 67 are connected to a terminal with minus (−) polarity of the battery. The respective ring parts 55a and 56a of the two-part ring electrodes 55 and 56 are connected to the ring electrodes 51 and 52 and the respective ring parts 55b and 56b thereof are connected to the ring electrodes 53 and 54, respectively. Through the booster coils 8 on the piston side of the first-to-sixth assemblies is flown the direct current from the battery 43 in parallel and identical direction.

In the arrangement of connection in the manner as described hereinabove, whenever the flow of the current is inverted in the two-part ring electrodes 55 and 56 by the rotation of the crank shaft at every 180 degree, the directions of the exciting current which flows through the exciting coils 5 of the first-to-sixth assemblies are also inverted, thereby inverting the magnetic field so as to shift the attracting force and the repellent force alternately in the cylinder 2.

It is to be noted herein that in this embodiment the adjacent assemblies generate the attracting force and the repellent force in an opposite way, that is, more specifically, for example, in the first and second assemblies, one of the adjacent assemblies generates the attracting force while the other assembly generates the repellent force. In this case, when the polarity of the outer cylinders 3 of the first and second assemblies is taken into account, for instance, the outer cylinder 3 of the first assembly is magnetized to the S pole and the outer cylinder 3 of the second assembly is magnetized to the N pole. In this case, however, the modes of generating the magnetic pole on the side of the outer cylinder 3 become complicated because the outer cylinder 3 of the first assembly is magnetically connected to the outer cylinder 3 of the second assembly. As a technique for causing no magnetic poles to generate in a complicated manner, there may be adopted a procedure, for example, which comprises rotating the electromagnetic piston engine by exciting the outer cylinders so as to generate the repellent force alone without carrying out the excitation of generating the attracting force.

FIG. 18 shows an example for embodying the above technique. In this case, each of the ring-shaped electrodes 51 to 54 as shown in FIG. 16 is replaced with a two-part ring and one of the ring parts is used so as to cause the current in the direction of generating the attracting force to fail to flow through the exciting coil 5. This construction of the ring-shaped electrodes can operate the piston engine by the repellent force. In this case, too, for instance, when the exciting coil 5 is excited so as to cause the repellent force to be generated in the first assembly, that is, to cause the cylinder 2 to be magnetized to the S pole, the outer cylinder 3 becomes magnetized to the N pole. However, in this case, as the outer cylinder 3 of the first assembly is magnetically connected to the outer cylinder 3 of the second assembly, the outer cylinder 3 of the second assembly becomes magnetized to the N pole. This north pole, however, appears as it is in the cylinder 2 of the second assembly because the exciting coil 5 of the second assembly is not excited so that, as a consequence, a weak magnitude of the attracting force is caused to act on the piston (S pole) of the second assembly. Such a measure can also be taken against the embodiment in which the three-phase alternating current is employed in the manner as described hereinabove and, in this case, control to cause no exciting current to flow in the direction of generating the attracting force can be exercised by the inverter 42.

As an alternative way, an embodiment indicated in FIG. 16 can be adopted, in which all the pistons of the first, third and fifth assemblies are set so as to have their topside ends magnetized always to the S pole while all the pistons of the second, fourth and sixth assemblies are set so as to have their topside ends magnetized always to the N pole. In this arrangement of the magnetic poles on the topside ends of the pistons, for instance, when the repellent force is generated in the first assembly, the outer cylinders 3 of the first and second assemblies are both magnetized to the N pole. Therefore, even if the exciting current is allowed to flow through the exciting coil 5 of the second assembly in the direction of magnetizing the cylinder 2 to the S pole, it is to be considered that the first and second assemblies are not operated so as to act on each other in the manner of canceling their own magnetic power. Thus, the S pole of the cylinder 2 can attract the N pole of the piston in the second assembly.

As a further technique, there may be employed a process, as shown in FIG. 19(A), which comprises fabricating outer cylinders of the adjacent assemblies, for example, outer cylinders $3_1$ and $3_2$ of the first and second assemblies, by a non-magnetic material so as to fail to act as the other magnetic pole of exciting coils $5_1$ and $5_2$, respectively, and instead connecting the exciting coils $5_1$ and $5_2$ to the respective two assemblies to each other through a connecting column 4. More specifically, a cylinder $2_1$ of the first assembly to a cylinder $2_2$ of the second assembly through the connecting column 4. The connecting column 4 may be made of a silicon steel plate or the like. In this arrangement, the pistons $1_1$ and $1_2$ of the respective first and second assemblies allow the magnetic poles of the identical polarity, for example, the S pole in this embodiment, to be directed each to the respective cylinders $2_1$ and $2_2$.

In this construction, when the exciting coils $5_1$ and $5_2$ of the respective first and second assemblies are to be excited simultaneously, the exciting current may be flown through each of the exciting coils $5_1$ and $5_2$ so as to alternately invert the magnetic polarity in substantially the same manner as in the embodiment as shown in FIG. 16. An inversion mechanism of the exciting current, that is, a mechanism for inverting the magnetic polarity of the exciting current, may be the same as that indicated in FIG. 16.

On the other hand, in the construction as shown in FIG. 19(A), it is possible to alternately excite the exciting coils $5_1$ and $5_2$ of the first and second assemblies. Specifically, one of the exciting coils is being excited while the excitation of the other is suspended, then followed by exciting the one exciting coil while the excitation of the one is suspended and alternately repeating this series of the operations. More specifically, in this case, the exciting coil $5_1$ of the first assembly is excited to generate the S pole in the cylinder $2_1$ and to allow the repellent force to act onto the piston $1_1$. On the other hand, during that period of time during which the first assembly is operated, the excitation of the exciting coil $5_2$ of the second assembly is being suspended. This operation generates the N pole in the cylinder $2_2$ of the second assembly and creates the attracting force in the piston $1_2$ thereof. In the next cycle of the actions, the exciting coil $5_2$ of the second assembly is excited to generate the S pole in the cylinder $2_2$ and to allow the repellent force to act onto the piston $1_2$. On the other hand, during that period of time during which the second assembly is operated, the excitation of the exciting coil $5_1$ of the first assembly is being suspended. This operation allows the cylinder $2_1$ of the first assembly to generate the N pole to thereby create the attracting force in the piston $1_1$ thereof. By implementing the actions in the cycles as described hereinabove in a repeated way, even if only either one of the exciting coils 5 of the first and second assemblies is excited, the attracting force can be generated in one of the first and second assemblies when the repellent force is generated in the other thereof.

The process of alternately magnetizing the assemblies, e.g. the first and second assemblies, in the manner as described hereinabove offers the advantages that, as the amount of the exciting current required for the first and second assemblies is sufficient enough to excite either one of the exciting coils 5 of the first and second assemblies, the amount of consumption of the exciting current can be reduced and, as a consequence, energy can be saved. Further, in the construction as described hereinabove, it is possible to ensure a wider space for winding exciting coils about the exciting coil 5 than the previous embodiments as described hereinabove, thereby enabling the exciting coils to be wound thereon in a larger number of windings and obtaining greater magnetic force by a smaller electric power in the manner as described hereinabove with reference to FIG. 4. Further, this construction can utilize the magnetic force without useless consumption and save energy in an extremely useful fashion.

Further, the process of alternately magnetizing the assemblies can present the merit that the inversion of the magnetic polarity of the exciting current is no longer required when the directions of winding the exciting coils $5_1$ and $5_2$ of the respective first and second assemblies are inverted from each other, because in this construction the exciting current that flows through the exciting coils $5_1$ and $5_2$ can always flow in a one direction. Therefore, this construction can simplify the inversion mechanism as indicated in the embodiment as shown in FIG. 16 above. Specifically, this construction can allow the brushes 67 and 68 to be removed from the embodiment indicated in FIG. 16.

In the embodiment of FIG. 19(A), for brevity of explanation of the concept involved in the present invention, it is shown the case that the exciting coils $5_1$ and $5_2$ are wound about the connecting column 4 at the portions close to the respective cylinders $2_1$ and $2_2$. In a more preferred mode, the exciting coils $5_1$ and $5_2$ may be wound about the whole body of the connecting column 4 so as for the exciting coils to overlap with each other. In this construction, when the exciting coil $5_1$ is taken into account, the cylinder $2_1$ is in a one pole while the cylinder $2_2$ is in the other pole. Likewise, when the exciting coil $5_2$ is taken into account, the cylinder $2_2$ is in a one pole while the cylinder $2_1$ is in the other pole. In other words, the cylinders $2_1$ and $2_2$ can be said to be in the coupled poles when looking at the exciting coils $5_1$ and $5_2$.

In instances where the exciting coils are wound in an overlapping manner in the manner as described above, it is meaningless if the magnetic forces created are caused to cancel each other by simultaneously exciting the exciting coils. Further, in order to excite the exciting coils $5_1$ and $5_2$ in such a manner that the magnetic forces fail to cancel each other, it is preferred that a single exciting coil be employed in a manner as will be described hereinafter in connection with an embodiment as shown in FIG. 19(B). Therefore, as a general rule, it is preferred to fail to excite the exciting coils simultaneously. The same thing can be applied to the processes for alternately exciting the exciting coils, that is, in which the excitation of one exciting coil is suspended while the other exciting coil is excited. As a specific way of wiring, the brushes 67 and 68 are removed in the embodiment as shown in FIG. 16. Further, in instances where the exciting coils are wound in an overlapping manner, it may be possible to utilize the magnetic force efficiently because very strong coupled poles are allowed to occur in the cylinders $2_1$ and $2_2$ by exciting the exciting coils $5_1$ and $5_2$, respectively.

As an alternative embodiment of FIG. 19(A), it may be illustrated such that the exciting coils $5_1$ and $5_2$ are wound each about the half portion of the connecting column 4 so as to fail to overlap with each other. In this case, for example, the exciting coil $5_1$ can be excited so as to cause the cylinder $2_1$ to be magnetized to the S pole when the exciting coil $5_2$ is excited to magnetize the cylinder $2_2$ to the N pole.

Moreover, as shown in FIG. 19(B), the connecting column 4 connecting the cylinder $2_1$ to the cylinder $2_2$ may be wound with a single exciting coil 5 alone and the exciting current may be fed to the single exciting coil with the inversion mechanism so as to invert the magnetic polarity. Although this process requires the inversion of the exciting current, this construction can offer the merit that the number of structuring parts can be reduced because only one exciting coil 5 can be employed sufficiently for the two assemblies. As a specific wiring, the brushes 67 and 68 as used in the embodiment of FIG. 16 are removed and the wiring between the brushes 61 and 64 is connected to each other and the wiring between the brushes 62 and 63 are connected to each other, thereby making the wiring simple. Further, the number of windings per one exciting coil 5 can be further increased as compared with the embodiment as shown in FIG. 19(A) because in this embodiment only the single exciting coil 5 is wound about the connecting column 4; unlike in the embodiment as shown in FIG. 19(A) where the two exciting coils $2_1$ and $2_1$ are wound about the connecting column 4. Therefore, the magnetic forces to be generated can be made further greater and the exciting current can be made lower by that portion, thereby assisting in saving energy to a greater extent.

Figure 20:
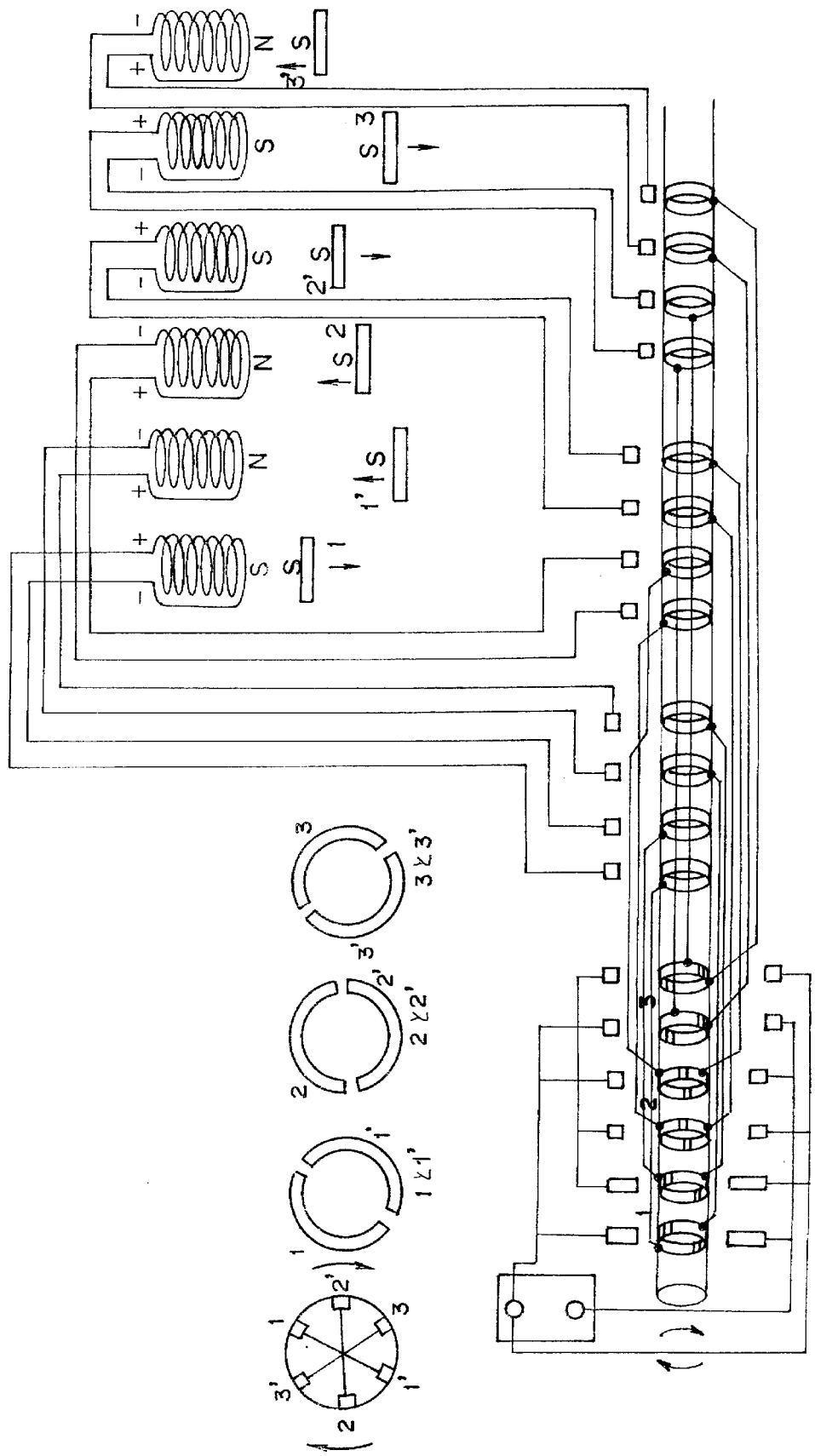
FIG. 20 is views for describing another procedure of driving the electromagnetic piston engine with 6-series assemblies by a battery using a mechanical rectifier.
Figure 21:
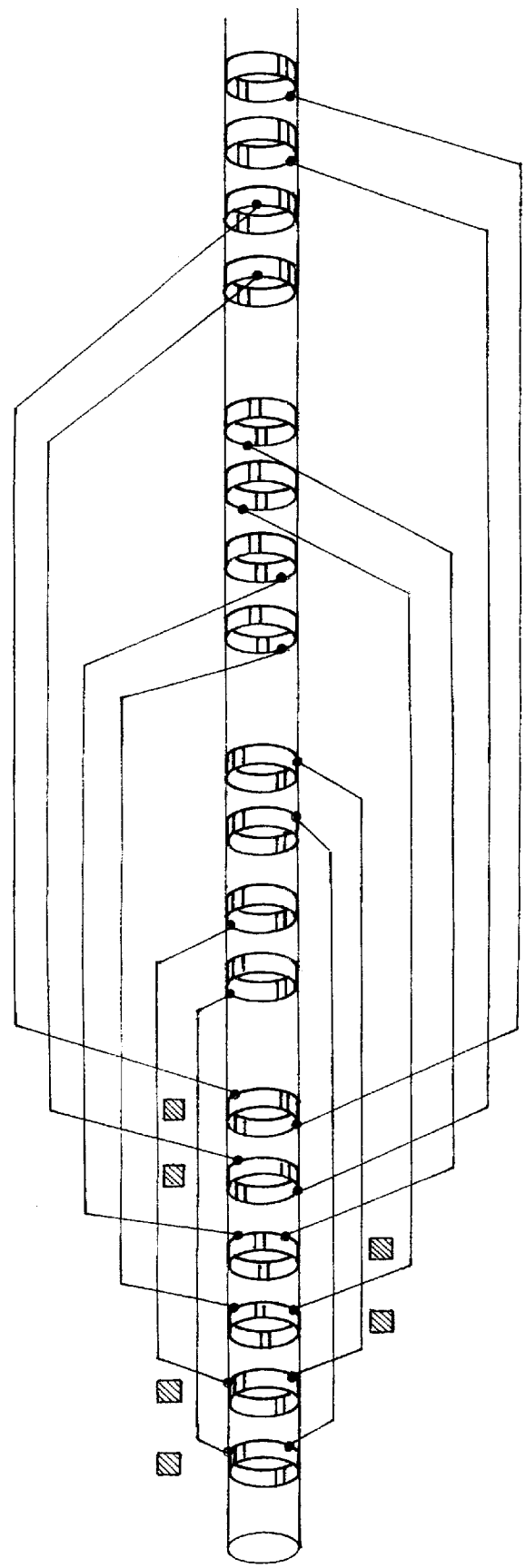
FIG. 21 is views showing a variation of the mechanical rectifier of FIG. 20.

In the embodiment as shown in FIG. 16, the every three assemblies out of the first-to-sixth assemblies are so disposed as to deviate their crank shafts by 180 degree. The embodiment as shown in FIG. 16 can also be applied to an embodiment as shown in FIG. 13 where each crank angle of the first-to-sixth assemblies is disposed so as to be deviated by 60 degree from each other. FIG. 20 shows such an embodiment, for example, in which a ring (electrode) is mounted on each of both ends of the exciting coil 5 of each of the first-to-sixth assemblies, that is, a total number of twelve ring electrodes are mounted on the exciting coils 5 of the first-to-sixth assemblies and six out of the twelve ring electrodes are constituted each by a two-part ring. Further, the position of division of each two-part ring with respect to the position of the crank angle is set as indicated in the drawing. By connecting the exciting coils 5 of the first-to-sixth assemblies to each other in the manner as shown in FIG. 20 so as for the current flowing through the exciting coils 5 to be inverted at every 180 degree of the crank angle with the rings and the two-part rings, the excitation by the three-phase current can also be conducted. The such connection can be performed in an appropriate way by a current of whatever phase in accordance with the number of assemblies. Further, in order to perform the excitation for generating the repellent force alone in the manner as described hereinabove, the total number of twelve ring electrodes are each replaced with a two-part ring electrode, as shown in FIG. 21, and the part of each two-part ring electrode, which is otherwise used at the timing of exciting the attracting force, is disposed so as to be not employed in a manner as described hereinabove.

Figure 22:
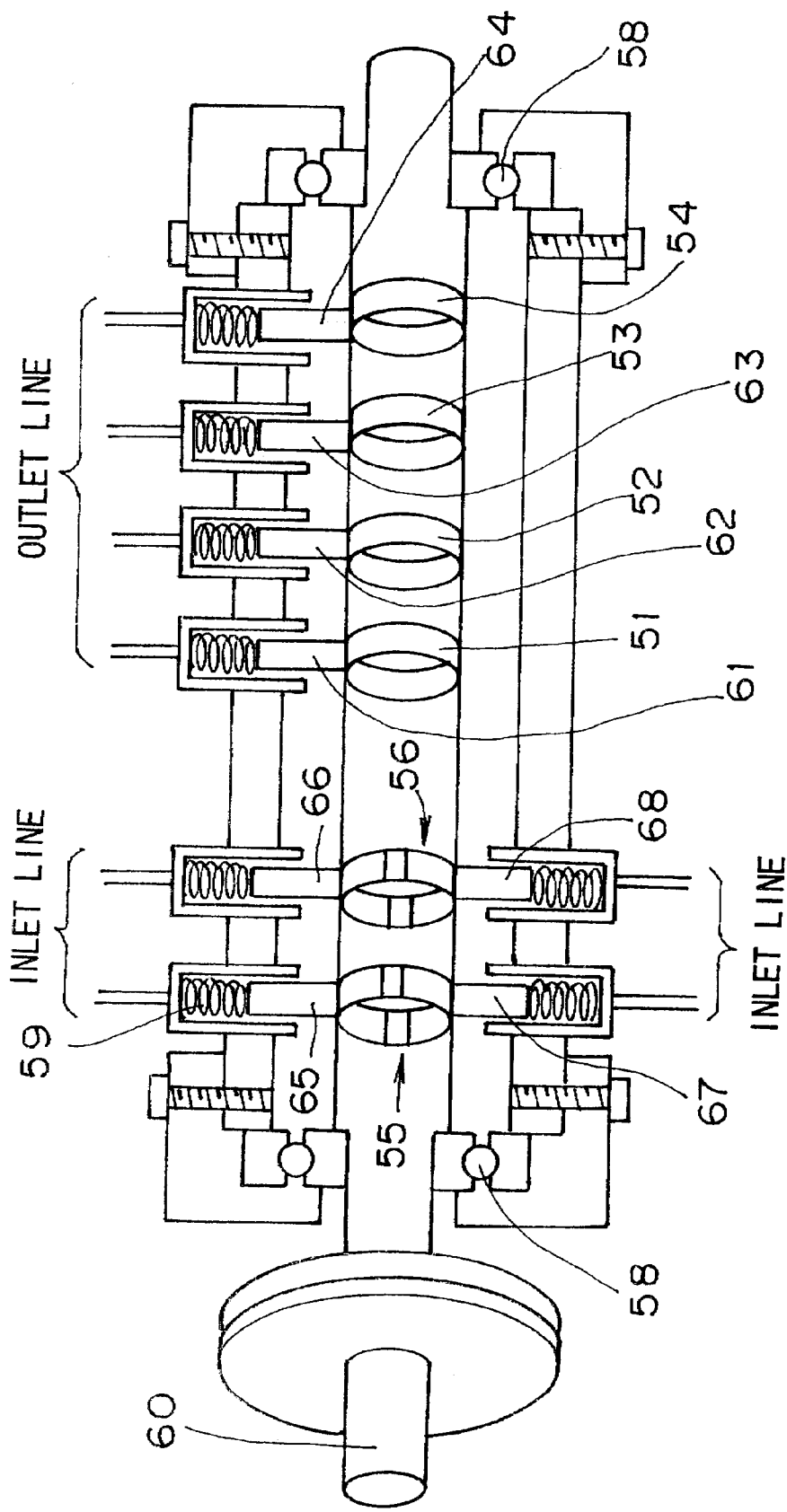
FIG. 22 is a view showing a rotary switch of the electromagnetic piston engine with 6-series assemblies.
Figure 23:
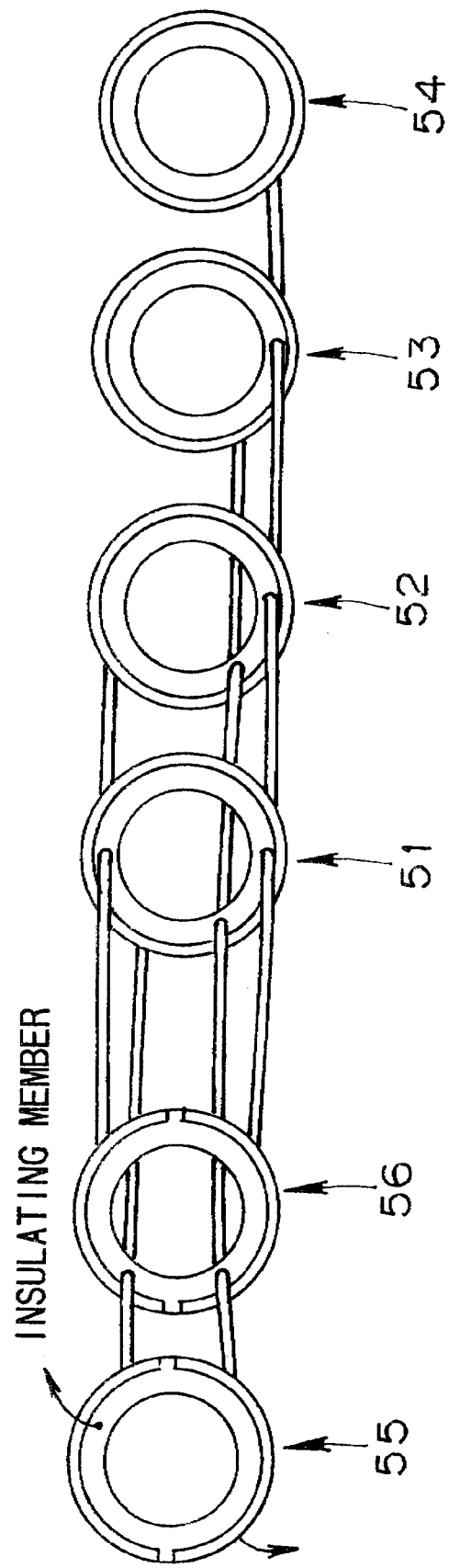
FIG. 23 is a view showing a wiring way of each electric pole in the rotary switch.

FIGS. 16 to 21, inclusive, are directed to each an embodiment in which no variable control over a rotational speed is performed. It is to be understood herein that it is possible to use a method, for example, for conducting a variable control over a direct voltage of a battery with a DC-DC converter or the like if the variable control of the rotational speed is to be performed in those embodiments. As other processes, there may be employed embodiments in which the control over the rotational speed is performed in a positive way. FIG. 22 shows an embodiment in which the portion of the rings 51 to 54 and the two-part rings 55 and 56, each used in the embodiment as shown in FIG. 16, is separated from the crank shaft and a rotary shaft is mounted instead which can be rotated with a motor that can control the rotational speed. The such construction is referred to as a rotary switch merely for convenience of explanation. On the rotary shaft of the rotary switch is mounted the motor via a pulley or a sprocket. This embodiment has the other construction that are the same as in the embodiment as shown in FIG. 16. More specifically, a rotary shaft 60 is rotatably supported to a casing 57 via a bearing 58 and the two-part rings 55 and 56 as well as the rings 51 to 64 are mounted on the rotary shaft 60. The brushes 61 to 68 are disposed projecting from the casing 57 while depressing each of the rings 51 to 56 with a spring 59. The electrical connection between the rings 51 to 54 and the two-part rings 55 and 56 is performed in a manner as shown in FIG. 23, more specifically, in which an insulating member 69 is disposed inside each of the rings and it is provided with an appropriate aperture through which a wiring passes over the entire length. In the above construction, the rotational speed of the rotary shaft can be controlled with freedom with the motor, thereby enabling control over the rotational speed of the electromagnetic piston engine in accordance with the rotational speed of the rotary shaft. As this construction does not require high torque for the motor, a motor of a compact size can be used for the electromagnetic piston engine according to the present invention.

Figure 25A:
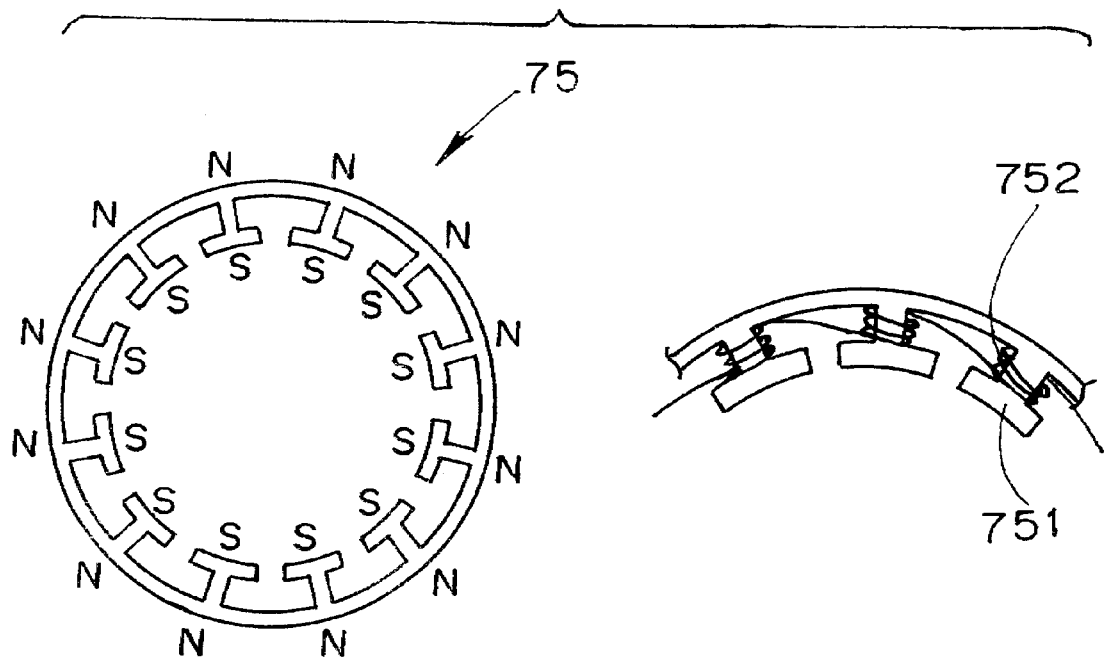
FIG. 25 is views each showing a non-contact type ring in a non-contact type rotary switch.
Figure 25B:
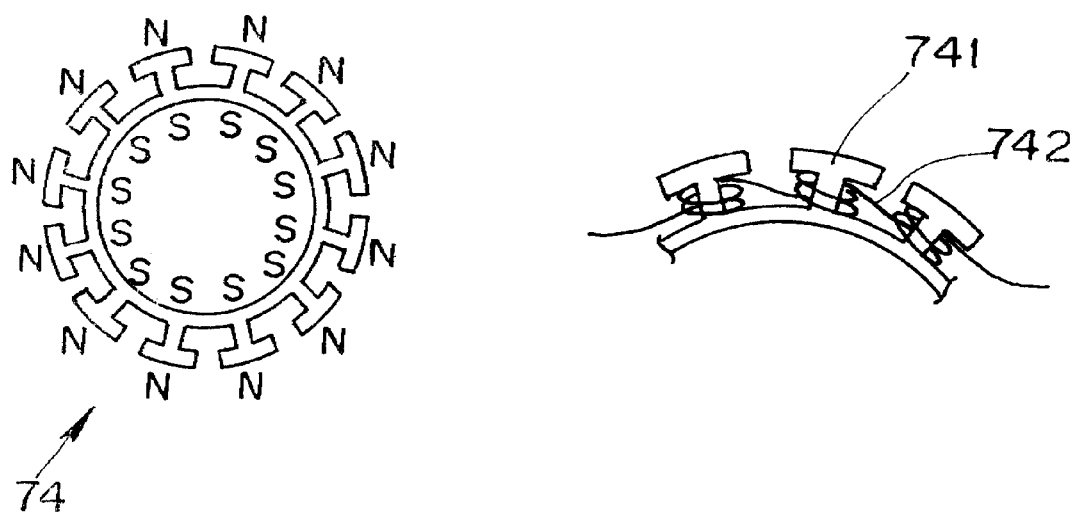

In each of the embodiments as shown in FIGS. 16 to 22, the current is fed to the exciting coils 5 in a slidable contact system where the rings and the brushes are employed. It is to be understood, however, that the present invention is not limited to such a slidable contact system and the current can be fed to the exciting coils 5 in a non-contact system where electrical induction is applied and the brushes can be removed. FIGS. 24 and 25 show such embodiments in which there is employed a member that can be substituted for the rotary switch of FIG. 22 and it is referred to herein as a non-contact type rotary switch for brevity of explanation. FIG. 24 indicates a mechanism that can play a role as the two-part ring 55 or 56 in the embodiment of FIG. 22 and the mechanism is referred to herein as a non-contact type two-part ring for brevity of explanation. FIG. 25 indicates a mechanism that can play a role as the ring 51, 52, 53 or 54 in the embodiment of FIG. 22 and the mechanism is referred to herein as a non-contact type ring for brevity of explanation. For the non-contact type rotary switch, two of the non-contact type two-part rings as shown in FIG. 24 are provided so as to correspond to the two-part rings 55 and 56 and four of the non-contact type rings as shown in FIG. 25 are provided so as to correspond to the rings 51 to 54.

A description will now be made of the non-contact type two-part rings as shown in FIG. 24. The casing 57 is made of a non-magnetic material and the rotary shaft 60 is supported in the inside thereof so as to be rotatable. On the rotary shaft 60 are mounted a two-part rotor constituted by two parts 70 and 71. The two-part rotor part 70 is of a half-ring shape and made of a magnetic material. The rotor part 70 has a plurality of projecting poles 701 disposed projecting outwardly in the directions of the diameter of the ring. The projecting poles 701 are each wound with a coil in the identical direction and the coils are connected to each other in series. The two-part rotor part 71 has the same construction as the rotor part 70.

On the casing 57 are mounted two stators 72 and 73 which face each other and are located in opposite positions present in the line extending across the diameter of the casing. The stator 72 accommodates a projecting pole 721 projecting toward the inside of the casing and a coil 722 wound about the projecting pole in its coil cover 724 made of a non-magnetic material. The projecting pole 721 is constructed such that a permanent magnet 723 made of a rare earth element and having a strong magnitude of magnetic force is disposed on the other side of the projecting pole 721. The permanent magnet 723 is mounted so as for its surface facing the projecting pole 721 to be magnetized to the N pole. The both ends of the coil 722 are connected to terminals with plus (+) polarity and minus (−) polarity of the battery 43. This construction allows the direct current to flow in the coil 722 in the direction in which the topside end of the projecting pole 721 becomes magnetized to the N pole. The coil cover 724 is mounted on the casing 57 by screwing. On the other hand, the stator 73 has substantially the same construction as the stator 72 with the exception that the permanent magnet is disposed in the direction in which the surface thereof directed to the projecting pole is magnetized to the S pole and the direct current is allowed to flow in the coil in the direction in which the topside end of the projecting pole becomes magnetized to the S pole.

Next, a description will be made of the non-contact type ring as shown in FIG. 25. The non-contact type ring comprises a rotor 74 fixed to the rotary shaft 60, and a stator 75 fixed to the inner wall of the casing 57. Both of the rotor 74 and the stator 75 are each made of a magnetic material and the rotor 74 is mounted coaxially in the inside of the stator 75. The rotor 74 is of a ring shape and has a plurality of projecting poles 741 each projecting outwardly in the direction extending across the diameter of the ring, and each of the projecting poles 741 is wound with a coil 742 in the identical direction. The coils 742 are connected to each other in series. On the other hand, the stator 75 is of a ring shape and has a plurality of projecting poles 751 each projecting outwardly in the direction extending across the diameter of the ring, and each of the projecting poles 751 is wound with a coil 752 in the identical direction. The coils 752 are connected to each other in series.

The electrical connection between two of the non-contact type two-part rings and four of the non-contact type rings in the non-contact type rotary switch is performed in substantially the same manner as shown in FIG. 16. More specifically, the both ends of each of the wires wound about the rotor parts 70 and 71 of the non-contact type two-part ring corresponding to the two-part ring 55 are connected to the respective ends of each of the wires wound about the non-contact type ring corresponding to the rings 51 and 53, respectively. Further, the both ends of each of the wires wound about the rotor parts 70 and 71 of the non-contact type two-part ring corresponding to the two-part ring 56 are connected to the respective ends of each of the wires wound about the non-contact type ring corresponding to the rings 52 and 54, respectively. The wires wound about the non-contact type rings corresponding to the rings 51 and 52 are connected to each other in series, while they are connected to the exciting coils 5 of the first, third and fifth assemblies in a parallel relationship. Likewise, the wires wound about the non-contact type rings corresponding to the rings 53 and 54 are connected to each other in series, while they are connected to the exciting coils 5 of the second, fourth and sixth assemblies in a parallel relationship.

In the arrangement of the connection in the manner as described hereinabove, when the crank shaft is rotated, electromotive force is electromagnetically induced in each of the rotating rotor part parts 70 and 71 by the magnetic field created by the magnetization of the stators 72 and 73 of the non-contact type two-part ring by the output of the battery 43. The electromotive force allows the current to flow through the wire wound about the rotor 74 of the non-contact type ring connected to each of the rotor parts 70 and 71, and the rotor 74 is magnetized to this current. The magnetization is performed in such a manner, for instance, that the outside portions of all the rotors 74 are magnetized to the N pole in the range of crank angles of, for example, 0 degree to 180 degree while the outside portions thereof are shifted to the S pole in the range of crank angles of, for example, 180 degree to 360 degree. As the rotor 74 is being rotated, the electromotive force is electromagnetically induced on the side of the stator 75 by the magnetic field of the rotor 74 and it excites the exciting coils 5 of the first-to-sixth assemblies. The exciting current is a direct current and inverts its direction at every half-cycle (180 degree) of the crank angle.

In accordance with the present invention, the rotational speed of the electromagnetic piston engine can be controlled by various other methods in addition to the methods as described hereinabove. For instance, there may be employed a method using a detector mounted on the crank shaft for detecting the crank angle, which may comprise a plurality of magnets disposed in plural locations, for example, along the circumferential direction of the crank shaft and Hall elements disposed nearby the locations of the magnets in a fixed manner and which is disposed to detect the positions of the magnets located on the crank shaft by the Hall elements. In accordance with the crank angle detected by the detector, the current can be fed from an exciting coil drive circuit constituted by electronics to the exciting coil 5 so as to allow the attracting force and the repellent force to alternately act on each assembly in the corresponding piston position.

INDUSTRIAL UTILIZABILITY

The electromagnetic piston engine according to the present invention is operated by the electromagnetic action and can generate greater magnetic force by a smaller exciting current because the number of windings of exciting coils can be increased to a large extent by its structure. Further, the magnetic force so produced can be utilized as a driving force so that this piston engine is extremely superior from the energy-saving point of view to usual electric drive motors and that it is suitable as a driving source particularly for electric vehicles and so on.

Where the magnetic force so produced is utilized as a driving force for electric vehicles in the manner as described hereinabove, a variety of technology developed for internal combustion piston engines for vehicles, such as power transmission mechanisms and so on, may also be used for electric vehicles with ease. Therefore, the current plants and equipment for manufacturing vehicles can also be applied to manufacturing electric vehicles and the technology involved in the present invention can also greatly contribute to facilitating the development of electric vehicles.

Further, the electromagnetic piston engine according to the present invention is not of the type rotating the rotor directly by the electromagnetic action as with conventional electric drive motors so that the problems with the heavy weight of a portion corresponding to the rotary assembly portion and so on, which are involved in conventional electric drive motors for vehicles, may be solved at once.

Moreover, the electromagnetic piston engine according to the present invention does not generate such a large amount of heat from its principles as with conventional internal combustion piston engines so that no cooling mechanism for cooling engines for vehicles is required, thereby contributing to making electric vehicles lightweight and compact in size. Also, as the electromagnetic piston engine according to the present invention can eliminate various mechanical resistance which is otherwise caused naturally from the structure itself of internal combustion piston engines, efficiency of energy consumption can be increased.

In addition, the electromagnetic piston engine according to the present invention is higher in efficiency of energy consumption as compared with gasoline engines, so that it is extremely advantageous over gasoline engines in terms of saving energy. Furthermore, as the electromagnetic piston engine uses electricity that is clean energy, it is extremely useful in terms of preservation of the environment of the earth.

I claim:

1. An electromagnetic piston engine comprising a cylinder made of a magnetic material, a piston made of a magnetic material and adapted to reciprocally move within the cylinder, a cylinder magnetization unit including an exciting coil for magnetizing the cylinder, and a piston magnetization unit for magnetizing a portion of the piston engageable with the cylinder so as to form a magnetic pole;

wherein the cylinder magnetization unit is disposed so as to magnetize the cylinder at a periodical interval and acts as a magnetic force between the cylinder and the piston to produce a reciprocal movement of the piston; and wherein the piston magnetization unit comprises a permanent magnet mounted on a base end side of the piston, and a booster coil mounted on the base end side of the piston for enhancing magnetic force of the permanent magnet in a manner that current is fed to the booster coil through a slidable contact mechanism.

2. The electromagnetic piston engine as claimed in claim 1, further comprising an electromotive force generation coil for generating electromotive force for feeding current to the booster coil, and a magnetic force generation unit for generating magnetic force;

wherein the electromotive force generation coil is disposed on the base end side of the piston;

wherein the magnetic force generation unit is disposed in a position on a side of the cylinder opposite to the electromotive force generation coil; and wherein the booster coil is excited by the electromotive force produced in the electromotive force generation coil by electromagnetic induction in the electromotive force generation coil from the magnetic force generation unit, without using the slidable contact mechanism for feeding current to the booster coil through the slidable contact mechanism.

3. An electromagnetic piston engine comprising a cylinder made of a magnetic material, a piston made of a magnetic material and adapted to reciprocally move within the cylinder, a cylinder magnetization unit including an exciting coil for magnetizing the cylinder, and a piston magnetization unit for magnetizing a portion of the piston engageable with the cylinder so as to form a magnetic pole;

wherein the cylinder magnetization unit is disposed so as to magnetize the cylinder at a periodical interval and acts as a magnetic force between the cylinder and the piston to produce a reciprocal movement of the piston; and wherein the piston magnetization unit includes a piston electromagnet coil wound about a base end side of the piston in a manner that current is fed to the piston electromagnet coil through a slidable contact mechanism.

4. The electromagnetic piston engine as claimed in claim 3, further comprising an electromotive force generation coil for generating electromotive force for feeding current to the piston electromagnet coil, and a magnetic force generation unit for generating magnetic force for feeding current to the piston electromagnet coil;

wherein the electromotive force generation coil is disposed on the base end side of the piston;

wherein the magnetic force generation unit is disposed in a position on a side of the cylinder opposite to the electromotive force generation coil; and wherein the piston electromagnet coil is excited by the electromotive force produced in the electromotive force generation coil by electromagnetic induction in the electromotive force generation coil from the magnetic force generation unit, without using the slidable contact mechanism for feeding current to the piston electromagnet coil through the slidable contact mechanism.

5. An electromagnetic piston engine comprising a cylinder made of a magnetic material, a piston made of a magnetic material and adapted to reciprocally move within the cylinder, a cylinder magnetization unit including an exciting coil for magnetizing the cylinder, and a piston magnetization unit for magnetizing a portion of the piston engageable with the cylinder so as to form a magnetic pole at the portion thereof;

wherein the cylinder magnetization unit is disposed so as to magnetize the cylinder at a periodical interval and acts as a magnetic force between the cylinder and the piston to produce a reciprocal movement of the piston;

wherein the electromagnetic piston engine further comprises an outer cylinder made of a magnetic material for accommodating the cylinder in its interior; and wherein the cylinder and the outer cylinder are each connected on a respective top side thereof to a connecting portion made of a magnetic material, and the connecting portion is wound with an exciting coil so as to magnetize the cylinder to one magnetic pole and the outer cylinder to an other magnetic pole.

6. The electromagnetic piston engine as claimed in claim 5, further comprising a cooling mechanism for cooling the cylinder, said cooling mechanism being interposed between the cylinder and the outer cylinder.

7. An electromagnetic piston engine comprising at least two assemblies disposed so as to be operated in a row, each assembly is arranged so as to allow a piston to move in a cylinder in a reciprocal way, and each assembly converts a reciprocal motion of the piston of each assembly into a rotational motion of a crank shaft by means of a crank mechanism;

wherein each of said assemblies comprises a cylinder made of a magnetic material, a piston made of a magnetic material, and a cylinder magnetization unit including an exciting coil for magnetizing the cylinder to form a magnetic pole;

wherein the cylinder magnetization unit of each of said assemblies forms a magnetic pole at the respective cylinder at a periodical interval so as to provide a magnetic force between the cylinder and the piston, thereby permitting a reciprocal movement of the piston; and wherein each of said assemblies is disposed so as to form a magnetic pole at a portion of the piston engageable with the cylinder, and the cylinders of the assemblies are magnetically coupled with each other through a magnetic member so as to form a first magnetic pole at the cylinder of one of the assemblies and to form a second magnetic pole opposite to the first magnetic pole at the cylinder of the other assembly.

8. The electromagnetic piston engine as claimed in claim 7, further comprising a mechanical rectifier mounted on the crank shaft;

wherein a direct current is fed from a direct current battery through the mechanical rectifier to the cylinder magnetization unit of each assembly so as to allow the attracting force to act on the piston when the piston is being directed to a top dead center from a bottom dead center and to allow the repellent force to act on the piston when the piston is being directed to the bottom dead center from the top dead center.

9. The electromagnetic piston engine as claimed in claim 7, further comprising a mechanical rectifier mounted on a rotary shaft and is rotatable with a motor capable of controlling a rotational speed at an optional speed;

wherein a direct current is fed from a direct current battery through the mechanical rectifier to the cylinder magnetization unit of each assembly so as to allow the attracting force to act on the piston when the piston is being directed to a top dead center from a bottom dead center and to allow the repellent force to act on the piston when the piston is being directed to the bottom dead center from the top dead center.

10. The electromagnetic piston engine as claimed in claim 7, further comprising a non-contact type rectifier of an electromagnetic induction type, the non-contact type rectifier comprising a first stator and a second stator each including a coil, and a first rotor and a second rotor each including a coil constituting a loop, said first and second stators being disposed on a side of a housing, and said first and second rotors being disposed on a side of the crank shaft, in a manner that current is fed from a direct current battery to the coil of the first stator to allow the first stator to create a magnetic field, so that the magnetic field electromagnetically induces a current in the coil of the first rotor to flow a current in the second rotor, thereby creating an electromotive force in the coil of the second stator by electromagnetic induction from the second rotor;

wherein the electromotive force produced in the coil of the second stator for the non-contact type rectifier of an electromagnetic type is fed to the exciting coil of the cylinder magnetization unit of each of said assemblies so as to act the attracting force upon the piston when the piston moves to a top dead center from a bottom dead center and so as to act the repellent force upon the piston when the piston moves to the bottom dead center from the top dead center.

11. The electromagnetic piston engine as claimed in claim 7, wherein the cylinder magnetization unit of a first assembly excites the exciting coil so as to magnetize the cylinder thereof; and the excitation by the cylinder magnetization unit of a second assembly is suspended during the excitation of the cylinder magnetization unit of the first assembly.

12. The electromagnetic piston engine as claimed in claim 11, wherein the pistons of said first and second assemblies are disposed in positions in phases inverted from each other;

wherein the pistons of said first and second assemblies are magnetized each to a magnetic pole of equal polarity; and wherein said first and second assemblies are arranged such that the cylinder of one of the two assemblies produces the repellent force and excitation of the cylinder of the other assembly is suspended during a period of time during which the cylinder of the one assembly is producing the repellent force.

13. The electromagnetic piston engine as claimed in claim 7, wherein the cylinder magnetization unit for a first assembly is excited to magnetize the cylinder thereof; and wherein the cylinder magnetization unit for a second assembly is excited so as to allow the cylinder thereof to assume a magnetic pole having opposite polarity from the cylinder of the first assembly.

14. The electromagnetic piston engine as claimed in claim 13, wherein the pistons of said first and second assemblies are disposed in positions in phases inverted from each other;

wherein the pistons of said first and second assemblies are magnetized so as to assume a polarity equal to each other; and wherein the cylinders of said first and second assemblies are excited in synchronization with each other so as to assume a polarity opposite to each other.

15. The electromagnetic piston engine as claimed in claim 7, wherein the pistons of the two assemblies are disposed in positions in phases inverted from each other;

wherein the piston of one of the two assemblies is magnetized to the S pole and the piston of the other assembly is magnetized to the N pole; and wherein the cylinder magnetization units of the two assemblies are excited in synchronization with each other so as to magnetize the cylinders to magnetic poles of equal polarity.

16. The electromagnetic piston engine as claimed in claim 7, wherein the cylinders of the two assemblies are coupled to each other through a connecting portion made of a magnetic material;

wherein the exciting coil of the cylinder magnetization unit is mounted on the connecting portion; and wherein the cylinder magnetization unit excites the exciting coil so as to allow the cylinders thereof to assume each a magnetic polarity opposite to each other, thereby creating a magnetic force between the cylinder and the piston for each assembly.

17. The electromagnetic piston engine as claimed in claim 16, wherein the exciting coil of the cylinder magnetization unit further comprises a first exciting coil segment and a second exciting coil segment, and the cylinder magnetization unit is arranged so as to flow an exciting current in one direction each to the first and second exciting coil segments in such a manner that the action to excite one of the two exciting coils during which suspends the excitation of the other exciting coil, and alternately the action to excite the other exciting coil during which suspends the excitation of the first exciting coil.

18. The electromagnetic piston engine as claimed in claim 16, wherein the exciting coil for the cylinder magnetization unit further comprises a first exciting coil segment and a second exciting coil segment; and wherein the first exciting coil segment and the second exciting coil segment are wound about the connecting portion in opposite directions, and the first and second exciting coils are arranged so as to allow an exciting current to flow in an equal direction and in such a manner that an alternate exciting current is simultaneously flown through the first and second exciting coil segments.

19. The electromagnetic piston engine as claimed in claim 16, wherein the cylinder magnetization unit includes a single exciting coil which is wound about the connecting portion; and wherein an exciting current is flown through the exciting coil so as to reverse its polarity at a periodical interval.

20. The electromagnetic piston engine as claimed in claim 19, wherein the pistons of the two assemblies are set to allow their positions to assume phases inverted from each other;

wherein the pistons of the two assemblies are magnetized to magnetic poles of equal polarity; and wherein the two assemblies are arranged such that the cylinder of one of the two assemblies produces the repellent force while the cylinder of the other assembly produces the repellent force by exciting the exciting coil while inverting the polarity of the exciting current at a periodical interval.

* * * * *